US011685130B2

(12) United States Patent
Holmes et al.

(10) Patent No.: US 11,685,130 B2
(45) Date of Patent: Jun. 27, 2023

(54) METHOD AND SYSTEM FOR IN-PROCESS MONITORING OF A COMPACTION ROLLER OF A COMPOSITE LAYUP MACHINE

(71) Applicant: The Boeing Company, Chicago, IL (US)

(72) Inventors: Tyler M. Holmes, Seattle, WA (US); Brice A. Johnson, Federal Way, WA (US); Sayata Ghose, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 5 days.

(21) Appl. No.: 17/401,138

(22) Filed: Aug. 12, 2021

(65) Prior Publication Data
US 2023/0052563 A1   Feb. 16, 2023

(51) Int. Cl.
*B32B 41/00* (2006.01)
*B29C 70/54* (2006.01)
(Continued)

(52) U.S. Cl.
CPC .............. *B29C 70/54* (2013.01); *B29C 70/30* (2013.01); *B29C 70/504* (2013.01); *G01J 5/00* (2013.01);
(Continued)

(58) Field of Classification Search
CPC ....... B29C 70/54; B29C 70/30; B29C 70/504; G01J 5/00; G01J 5/485; G01J 2005/0077;
(Continued)

(56) References Cited

U.S. PATENT DOCUMENTS 10,928,340 B2    2/2021   Johnson et al.
2003/0145932 A1*  8/2003   Holmes .............. B29C 65/1664
                                                      156/64

(Continued)

FOREIGN PATENT DOCUMENTS

EP    3702141 A1    9/2020

OTHER PUBLICATIONS

Extended European Search Report (EESR), European Patent Office, dated Jan. 2, 2023, for Application No. EP22179417.5, Applicant the Boeing Company, 5 pages.

*Primary Examiner* — Michael N Orlando
*Assistant Examiner* — Joshel Rivera

(57) ABSTRACT

There is provided a method that includes directing one or more infrared cameras at a compaction roller of a composite laying head of a composite layup machine. The one or more infrared cameras are mounted aft of the compaction roller. The method includes applying heat to a substrate by a heater. The heater is mounted forward of the compaction roller. The method further includes using the one or more infrared cameras, to obtain one or more infrared images of the compaction roller, during laying down of one or more composite tows of a composite layup onto the substrate by the compaction roller. The method further includes identifying, based on the one or more infrared images, one or more temperature profiles of the compaction roller, and analyzing identified temperature profiles, to determine one or more of, a layup quality of the composite layup, and a heat history of the composite layup.

20 Claims, 18 Drawing Sheets

(51) Int. Cl.
*G06V 20/52* (2022.01)
*B29C 70/30* (2006.01)
*B29C 70/50* (2006.01)
*G01J 5/00* (2022.01)
*G01N 25/72* (2006.01)
*G06T 7/00* (2017.01)
*G01J 5/48* (2022.01)
*B29L 31/30* (2006.01)

(52) U.S. Cl.
CPC ........... *G01N 25/72* (2013.01); *G06T 7/0006* (2013.01); *G06V 20/52* (2022.01); *B29L 2031/3076* (2013.01); *G01J 5/485* (2022.01); *G01J 2005/0077* (2013.01); *G06T 2207/10048* (2013.01); *G06T 2207/30144* (2013.01)

(58) Field of Classification Search
CPC ......... G06T 7/0006; G06T 2207/10048; G06T 2207/30144; G06V 20/52; B29L 2031/3076; G01N 25/72
USPC .................... 156/60, 64, 350, 351, 378, 379
See application file for complete search history.

(56) References Cited

U.S. PATENT DOCUMENTS

| | | |
|---|---|---|
| 2019/0061282 A1 | 2/2019 | Johnson et al. |
| 2019/0318444 A1* | 10/2019 | Juarez ................... G06T 1/0014 |
| 2019/0383759 A1* | 12/2019 | Johnson ................. G01N 11/14 |
| 2020/0276774 A1* | 9/2020 | Kisch ..................... B29C 35/16 |

\* cited by examiner

METHOD AND SYSTEM FOR IN-PROCESS MONITORING OF A COMPACTION ROLLER OF A COMPOSITE LAYUP MACHINE

CROSS-REFERENCE TO RELATED APPLICATIONS

This nonprovisional patent application is related to contemporaneously filed U.S. nonprovisional patent application Ser. No. 17/401,149, titled METHOD OF IN-PROCESS DETECTION AND MAPPING OF DEFECTS IN A COMPOSITE LAYUP, having Attorney Docket Number 20-1012-US-NP, filed on Aug. 12, 2021, the contents of which are hereby incorporated by reference in their entirety. By mention in this CROSS-REFERENCE TO RELATED APPLICATIONS section, the application having Attorney Docket Number 20-1012-US-NP is not admitted to be prior art with respect to this application having Attorney Docket Number 20-2258-US-NP.

FIELD

The disclosure relates generally to composite manufacturing and, more specifically, to improving manufacturing quality of composite structures. In particular, the disclosure relates to methods and systems for in-process monitoring of a compaction roller of a composite layup machine.

BACKGROUND

Composite structures may be used in a wide variety of applications, including in the manufacture of aircraft, due to their high strength-to-weight ratios, corrosion resistance, decreased weight, and other favorable properties. Further, composite materials provide longer service life for various components in an aircraft. In particular, in aircraft manufacturing, composite structures may be used to form the fuselage, wings, tail sections, and other parts of the aircraft.

However, monitoring and process control of composite material quality during the manufacturing process is a challenge. Composite materials are laid up in layers on a substrate or tool, and composite layup machines are typically used to automatically lay up such composite materials into a composite layup. During the manufacturing process, the composite layup can be monitored for any issues affecting an overall layup quality, for example, the presence of layup defects, foreign object debris (FOD), and tape tack quality issues, that may occur.

Known in-process monitoring methods and systems exist. One such known in-process monitoring method involves visual inspection by an operator. A visual inspection by an operator is a qualitative rather than a quantitative measure, and a visual inspection by an operator is not desirably sensitive. Further, when an operator conducts a visual inspection manually, operation of the composite layup machine is stopped during the inspection. This may result in delays in the manufacturing process, and in turn, increased costs of manufacturing.

Another known in-process monitoring method and system involves monitoring a part surface or substrate with a camera, for example, an infrared (IR) camera. However, monitoring the part surface or substrate may be difficult due to the presence of surface contour changes, and due to reflections and shifts in the field of view of the IR camera, which may result in the IR camera viewing materials or objects it is not set to view, e.g., a tool during movement. Further, it may be difficult for an IR camera to view optimal locations for monitoring the part surface or substrate due to angle and space limitations. This may result in inconsistent monitoring and inspections.

Another known in-process monitoring method and system involves monitoring and measuring an actual layup to provide data regarding layup conditions. However, such measurements may be subject to a large amount of noise and processing.

Therefore, it would be desirable to have a method and system that takes into account at least some of the issues discussed above, as well as other possible issues, and that provide advantages over known methods and systems. For example, it would be desirable to have at least one of a method or a system to quantitatively evaluate a layup quality and layup conditions of the composite layup during the layup process, and automate the verification of the layup quality. As another example, it would be desirable to have at least one of a method or a system using an infrared (IR) camera positioned to view optimal locations in an unobstructed and easily visible manner, to determine a layup quality and/or a heat history of the composite layup.

SUMMARY

Example implementations of the present disclosure provide a method and a system for in-process monitoring of a compaction roller of a composite layup, to determine a layup quality of the composite layup. As discussed in the below detailed description, versions of the method and system may provide significant advantages over known methods and systems.

In a version of the disclosure, there is provided a method. The method comprises the step of directing one or more infrared cameras at a compaction roller of a composite laying head of a composite layup machine, wherein the one or more infrared cameras are mounted aft of the compaction roller. The method further comprises the step of applying heat to a substrate by a heater, wherein the heater is mounted forward of the compaction roller.

The method further comprises the step of using the one or more infrared cameras, to obtain one or more infrared images of the compaction roller, during laying down of one or more composite tows of a composite layup onto the substrate by the compaction roller. The method further comprises the step of identifying, based on the one or more infrared images, one or more temperature profiles of the compaction roller, to obtain one or more identified temperature profiles. The method further comprises the step of analyzing the one or more identified temperature profiles, to determine one or more of, a layup quality of the composite layup, and a heat history of the composite layup.

In another version of the disclosure, there is provided a method for in-process monitoring of a compaction roller of a composite layup machine. The method comprises the step of directing one or more infrared cameras at a back side of a compaction roller of a composite laying head of the composite layup machine, wherein the one or more infrared cameras are mounted aft of the compaction roller. The method further comprises the step of applying heat to a substrate by a heater, wherein the heater is mounted forward of the compaction roller.

The method further comprises the step of monitoring the back side of the compaction roller, by using the one or more infrared cameras, to obtain one or more infrared images of the back side of the compaction roller, during laying down of one or more composite tows of a composite layup onto the substrate by the compaction roller. The method further comprises the step of identifying, based on the one or more infrared images, one or more temperature profiles of a back side portion of the compaction roller, to obtain one or more identified temperature profiles, wherein the one or more composite tows are in contact with the compaction roller. The method further comprises the step of analyzing the one or more identified temperature profiles, to determine one or more of, a layup quality of the composite layup, and a heat history of the composite layup.

In another version of the disclosure, there is provided a system for in-process monitoring of a compaction roller of a composite layup machine. The system comprises the composite layup machine. The composite layup machines comprises: (i) a composite laying head with a compaction roller coupled to the composite laying head; (ii) a heater mounted forward of the compaction roller, the heater configured to apply heat to a substrate; and (iii) one or more infrared cameras, mounted aft of the compaction roller, to monitor the compaction roller. The one or more infrared cameras are configured to each capture one or more infrared images of the compaction roller, during laying down of one or more composite tows of a composite layup onto the substrate by the compaction roller.

The system further comprises a control system configured to control the composite layup machine. The system further comprises a computer system having a composite analyzer. The composite analyzer is configured to identify, based on the one or more infrared images, one or more temperature profiles of the compaction roller, to obtain one or more identified temperature profiles, and to enable analyzing the one or more identified temperature profiles, to determine one or more of, a layup quality of the composite layup, and a heat history of the composite layup.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 1 is an illustration of an index showing that FIG. 1 includes FIG. 1A and FIG. 1B;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1A:
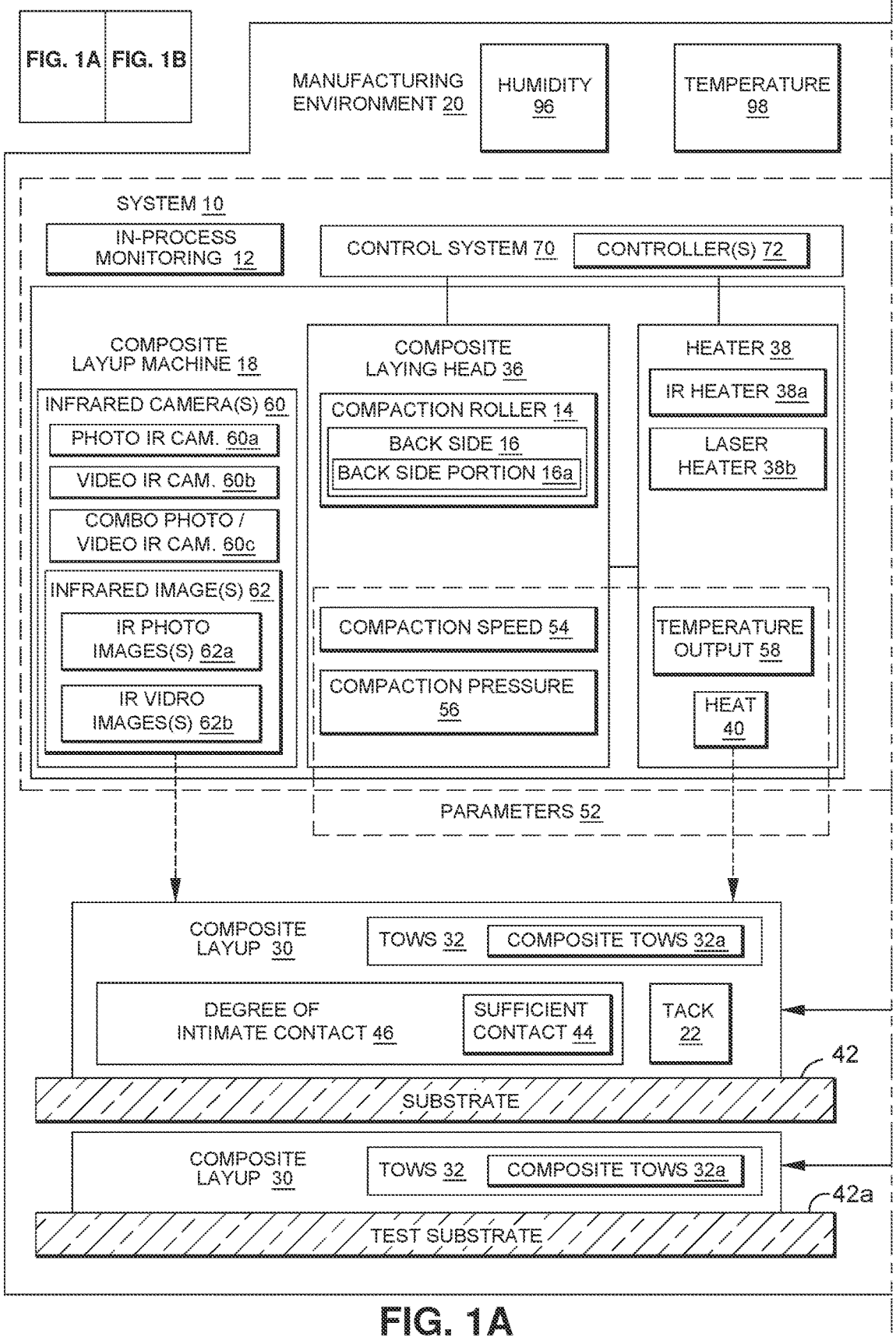
FIG. 1A is an illustration of a block diagram of a portion of a system for in-process monitoring of a compaction roller of a composite layup machine used in a manufacturing environment, in accordance with an illustrative version of the disclosure.
Figure 1B:
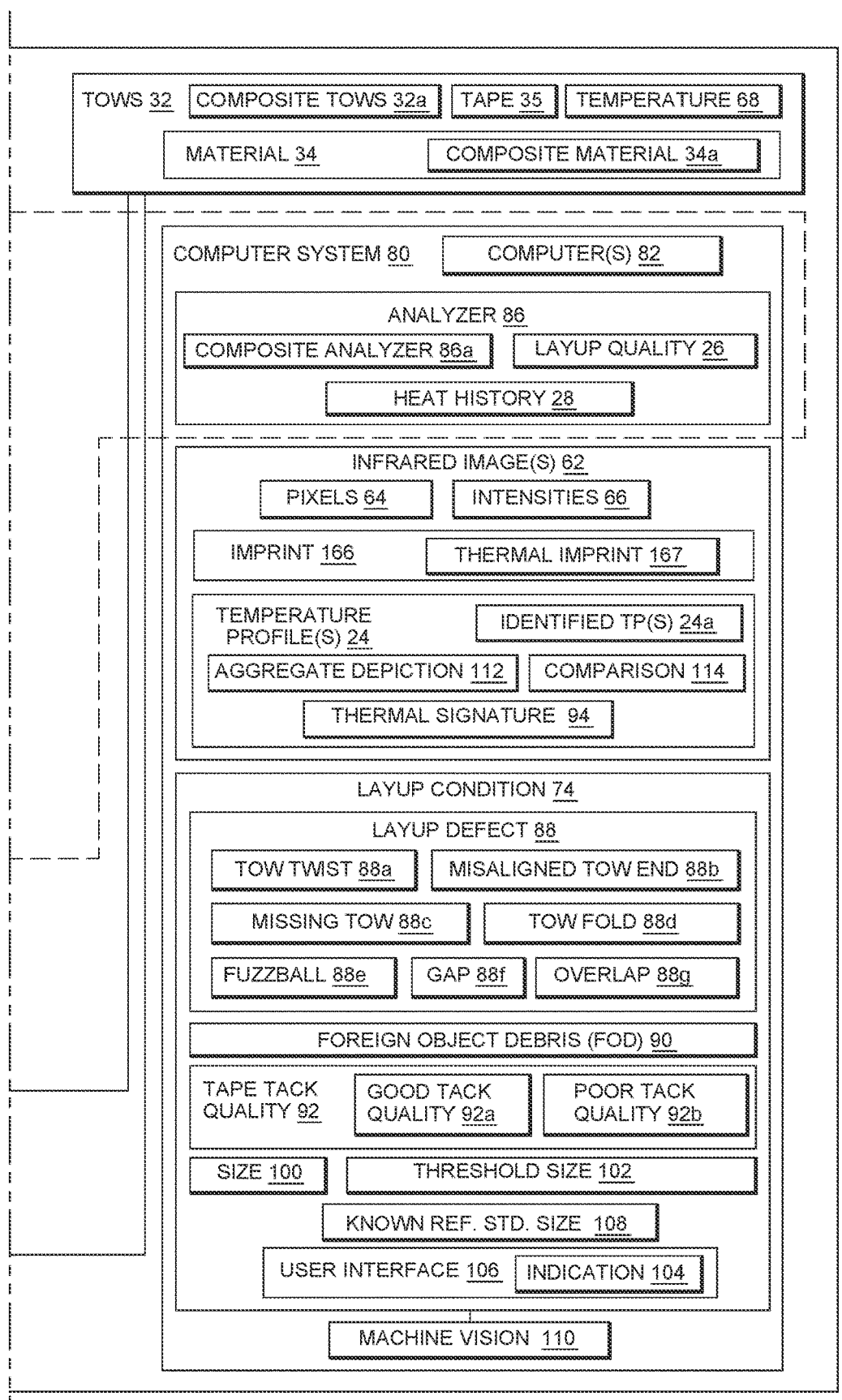
FIG. 1B is an illustration of a block diagram of a continued portion of the system of FIG. 1A, of the disclosure.

Now referring to the Figures, FIG. 1 is an illustration of an index showing that FIG. 1 includes FIG. 1A and FIG. 1B. FIG. 1A is an illustration of a block diagram of a portion of a system 10 for in-process monitoring 12 of a compaction roller 14, and in particular, a back side 16 of the compaction roller 14, of a composite layup machine 18, for example, an Automated Fiber Placement (AFP) composite layup machine 18a (see FIG. 3), used in a manufacturing environment 20, in accordance with an illustrative version of the disclosure. FIG. 1B is an illustration of a block diagram of a continued portion of the system 10 of FIG. 1A of the disclosure.

The blocks in FIGS. 1A and 1B represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the system 10 and the computer system 80 in FIGS. 1A and 1B are not meant to imply physical or architectural limitations to the manner in which an illustrative example may be implemented. Other components in addition to or in place of the ones illustrated may be used. Some components may be unnecessary.

The illustrative versions recognize and take into account one or more different considerations. For example, the illustrative versions recognize and take into account that Automated Fiber Placement (AFP) is a composite fabrication process. The illustrative versions recognize and take into account that Automated Fiber Placement (AFP) is a highly sensitive process. The illustrative versions recognize and take into account that out-of-tolerance fabrication can add undesirable costs and flow time to the manufacturing process. The illustrative versions recognize and take into account that a means for monitoring, controlling, and improving the Automated Fiber Placement (AFP) process is desirable.

The illustrative versions recognize and take into account that intimate contact between uncured composite layers affects the strength of a bond between the uncured composite layers, referred to as tack 22 (see FIG. 1A). Further, the illustrative versions recognize and take into account that the in-process monitoring 12 of the back side 16 of the compaction roller 14 identifies one or more temperature profiles 24 (see FIG. 1B) of the compaction roller 14, to obtain one or more identified temperature profiles 24a (see FIG. 1B), to determine a layup quality 26 (see FIG. 1B) and a heat history 28 (see FIG. 1B) of a composite layup 30 (see FIG. 1A).

The composite layup 30 is made up of layers of tows 32 (see FIGS. 1A-1B), such as composite tows 32a (see FIGS. 1A-1B). As used herein, "tow" means a bundle of continuous, untwisted, individual fibers forming narrow tapes and made of a material such as carbon, acrylic, viscose rayon, or another suitable material. In one exemplary version, the tow is a bundle of carbon fibers impregnated with epoxy resin and is 3 mm (millimeters) wide to 13 mm wide and approximately 0.13 mm thick and is wound around a spool. In one version, the tows 32, such as the composite tows 32a, comprise a material 34 (see FIG. 1B), such as a composite material 34a (see FIG. 1B). The tows 32, such as composite tows 32a, may be in the form of tape 35 (see FIG. 1B) or another suitable form.

The composite material 34a comprises thermoplastic materials and thermoset materials known in the art of composite part manufacturing, including carbon fiber reinforced polymer (CFRP) materials. The composite material 34a may comprise unidirectional or bidirectional fiber reinforcement impregnated with, and held in, a suitable resin matrix, such as a thermoplastic or a thermoset, i.e., prepregs. Exemplary thermoplastic resins include polyether ether ketone (PEEK), polyetherketoneketone (PEKK), polyphenylene sulfide (PPS), polyetherimide (PEI), polyaryletherketone (PAEK), or other suitable thermoplastic resins. Exemplary thermoset resins include epoxy, silicone, polyimides, bismaleimide, or another suitable thermoset resin.

As shown in FIG. 1A, the system 10 comprises the composite layup machine 18. The composite layup machine 18 comprises a composite laying head 36 (see FIG. 1A), with the compaction roller 14 coupled to the composite laying head 36. As further shown in FIG. 1A, the composite layup machine 18 comprises a heater 38 mounted forward of a front side 17 (see FIG. 3) the compaction roller 14. The heater 38 comprises an infrared (IR) heater 38a (see FIG. 1A), a laser heater 38b (see FIG. 1A), or another suitable heater. The heater 38 is configured to apply, and applies, heat 40 (see FIG. 1A) to a substrate 42 (see FIG. 1A). In one illustrative version, the substrate 42 is in the form of a test substrate 42a (see FIG. 1A).

When tows 32, such as composite tows 32a, are laid down onto the substrate 42 to form the composite layup 30, the substrate 42 heats the tows 32, such as the composite tows 32a, on the substrate 42. Heat 40 is conducted from the substrate 42 to the tows 32, such as the composite tows 32a, laid down onto the substrate 42. In the manufacturing environment 20, the composite laying head 36 lays down the tows 32, such as in the form of composite tows 32a, onto the substrate 42, and the compaction roller 14 compacts the tows 32, such as the composite tows 32a, onto the substrate 42.

Preferably, the tows 32, such as the composite tows 32a, are laid down to have a sufficient contact 44 (see FIG. 1A) with the substrate 42 and to have a degree of intimate contact 46 (see FIG. 1A) between the tows 32, such as the composite tows 32a.

The substrate 42 and the test substrate 42a take any desirable form. In some illustrative examples, the substrate 42 and the test substrate 42a each comprises a surface formed of prior laid layers of tows 32, such as composite tows 32a. In some illustrative examples, the substrate 42 and the test substrate 42a each comprises a tool surface.

Figure 15:
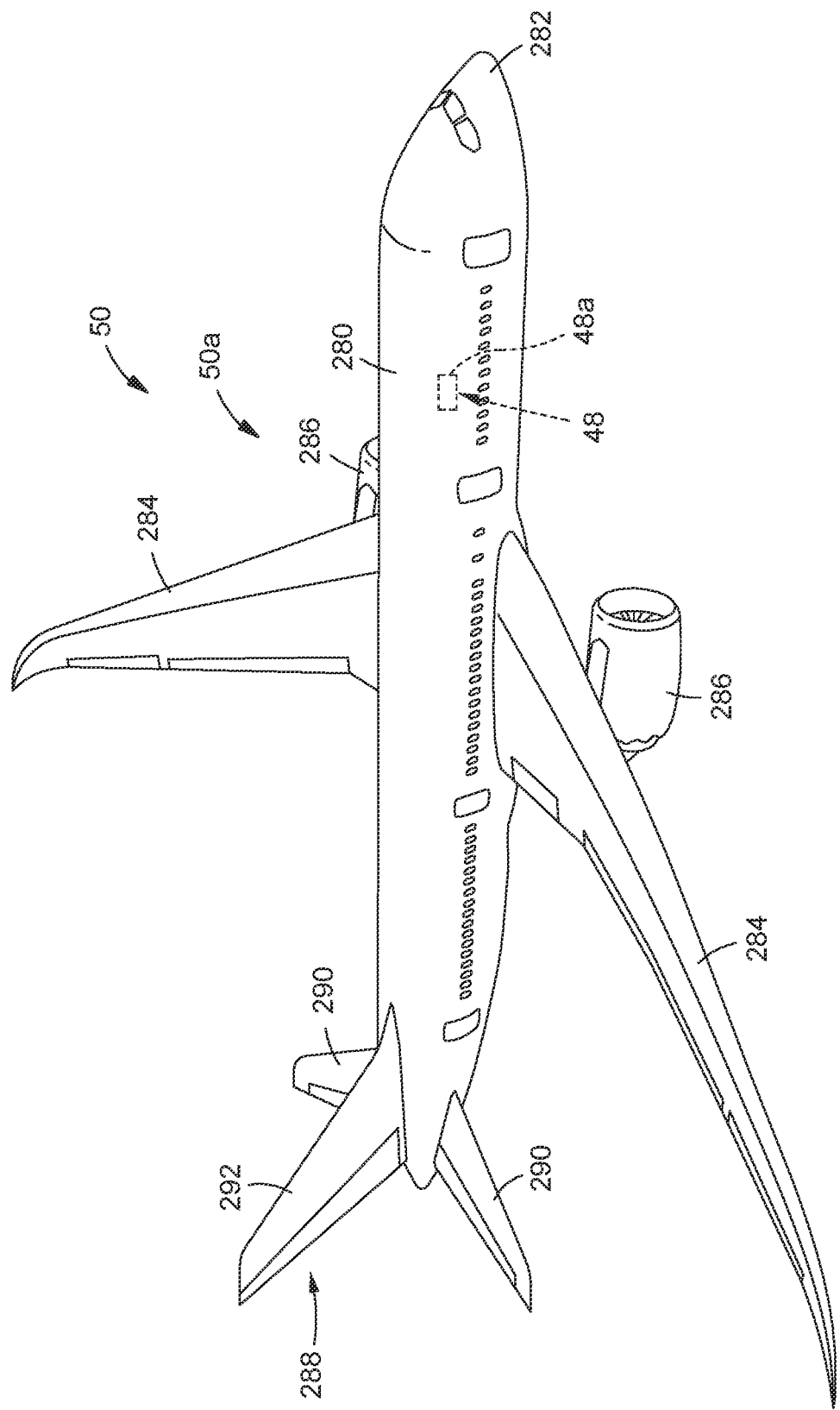
FIG. 15 is an illustration of a perspective view of an aircraft incorporating a composite part formed from a composite layup of tows that may be monitored using exemplary versions of a system and method of the disclosure.

The composite layup 30 is used to form a part 48 (see FIG. 15), such as a composite part 48a (see FIG. 15). In one illustrative version, the part 48, such as the composite part 48a, is used in the manufacture of a vehicle 50 (see FIG. 15), such as an aircraft 50a (see FIG. 15). The part 48, such as the composite part 48a, may also be made in the manufacture of vehicles 50, including rotorcraft, spacecraft, watercraft, and other suitable vehicles, or in the manufacture of suitable structures.

As further shown in FIG. 1A, parameters 52 of the composite layup machine 18 include a compaction speed 54 of the compaction roller 14, a compaction pressure 56 applied by the compaction roller 14, a temperature output 58 of the heater 38, and the heat 40 of the heater 38.

As shown in FIG. 1A, the composite layup machine 18 further comprises one or more infrared (IR) cameras 60, also referred to as thermal cameras. The one or more IR cameras 60 are mounted or attached to the composite laying head 36 of the composite layup machine 18 at a position that is aft of, or behind, the back side 16 of the compaction roller 14, to monitor the compaction roller 14, and in particular, to monitor the back side 16 of the compaction roller 14. As shown in FIG. 1A, each IR camera 60 may comprise a photographic (photo) infrared (IR) camera 60a, a video infrared (IR) camera 60b, a combination (combo) photographic (photo)/video infrared (IR) camera 60c, or another suitable IR camera.

The one or more IR cameras 60 are configured to each capture one or more infrared (IR) images 62 (see FIGS. 1A-1B) of the compaction roller 14, and in particular, of a back side portion 16a (see FIG. 1A) of the back side 16 of the compaction roller 14, during laying down and compaction of one or more tows 32 (see FIGS. 1A-1B), such as one or more composite tows 32a, of the composite layup 30, onto the substrate 42, by the compaction roller 14. Each of the one or more IR cameras 60 is positioned and directed behind, and aft of, the back side 16 of the compaction roller 14.

As shown in FIG. 1A, the one or more IR images 62 comprise one of, one or more infrared (IR) photographic (photo) images 62a, one or more infrared (IR) video images 62b, or another suitable IR image. Each IR image 62 has pixels 64 (see FIG. 1B) with intensities 66 (see FIG. 1B). The intensities 66 are representative of temperatures 68 (see FIG. 1B) of each of the tows 32, such as the composite tows 32a. The intensities 66 are further indicative of the amount of heat 40 conducted to the tows 32. The intensities 66 are further indicative of the level of contact between the tows 32 and the substrate 42. With greater amounts of contact between the tows 32 and the substrate 42, greater amounts of transfer of heat 40 occur. The temperature 68 of the tows 32, such as the composite tows 32a, in each of the one or more IR images 62 is lower than at a point of compaction 164 (see FIG. 3), beneath the compaction roller 14.

Figure 2:
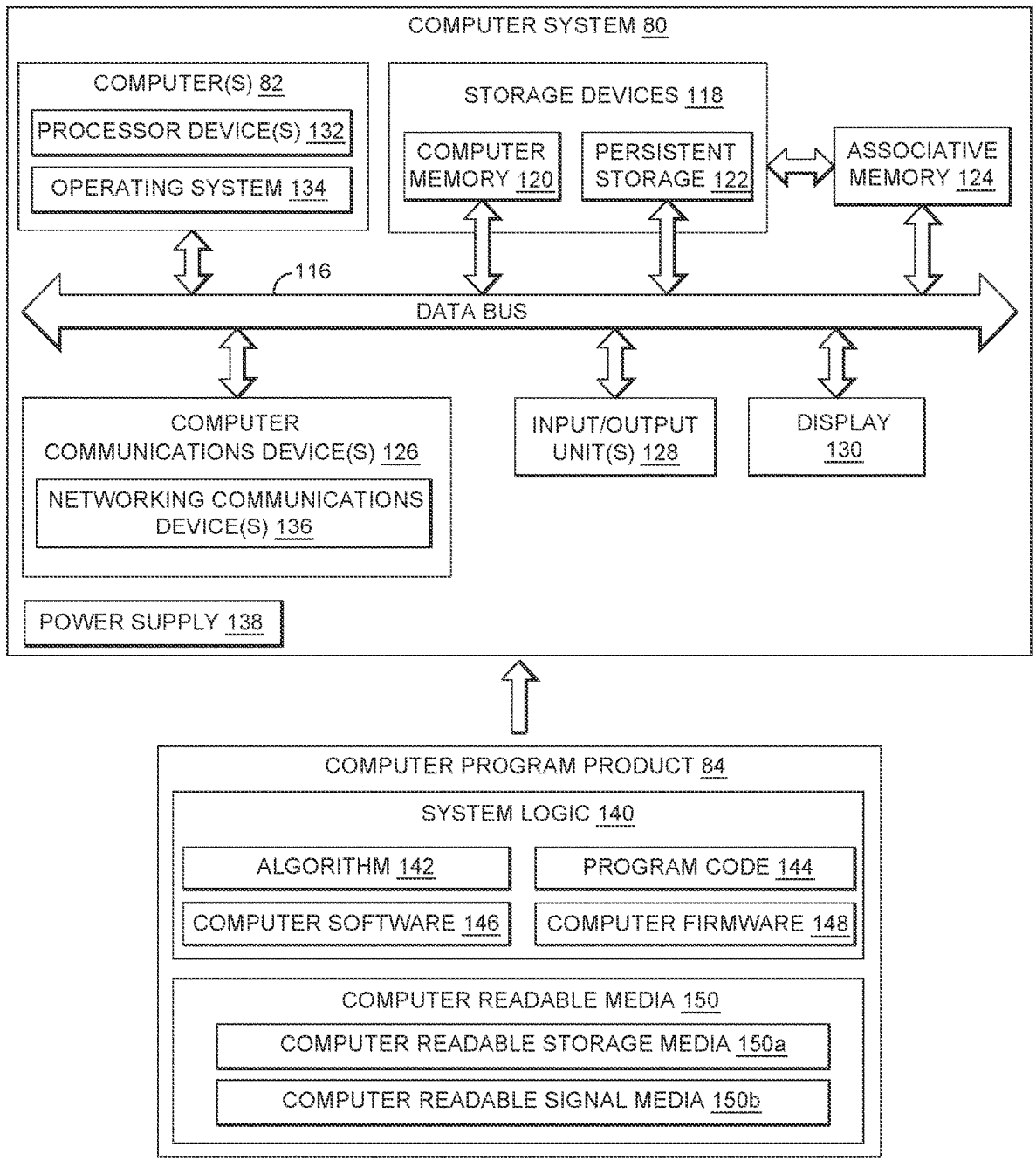
FIG. 2 is an illustration of a block diagram showing an exemplary version of a computer system of FIG. 1B, in more detail.
Figure 3:
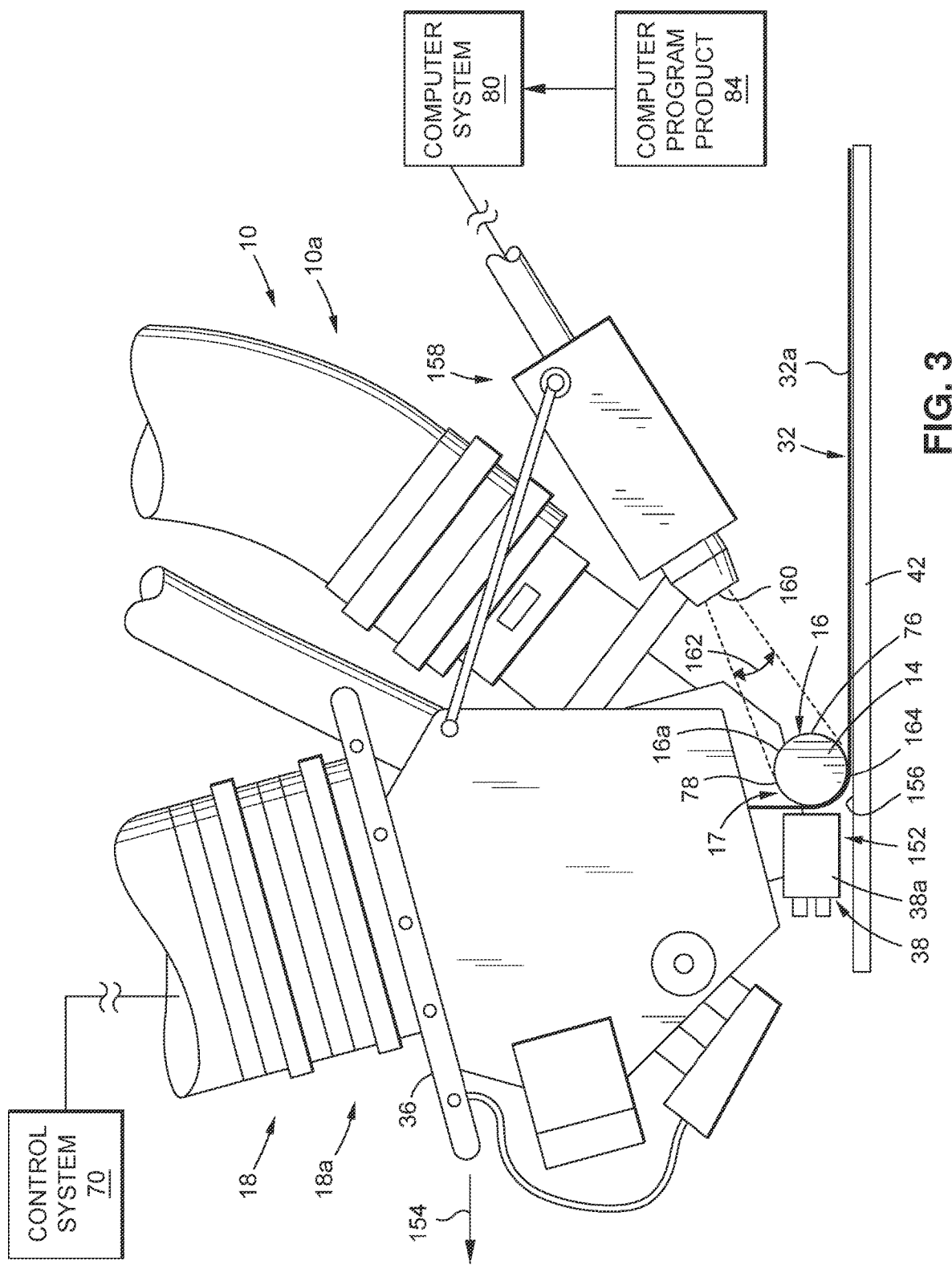
FIG. 3 is an illustration of a side view of a version of a system of the disclosure for in-process monitoring of a compaction roller of a composite layup machine.
Figure 4A:
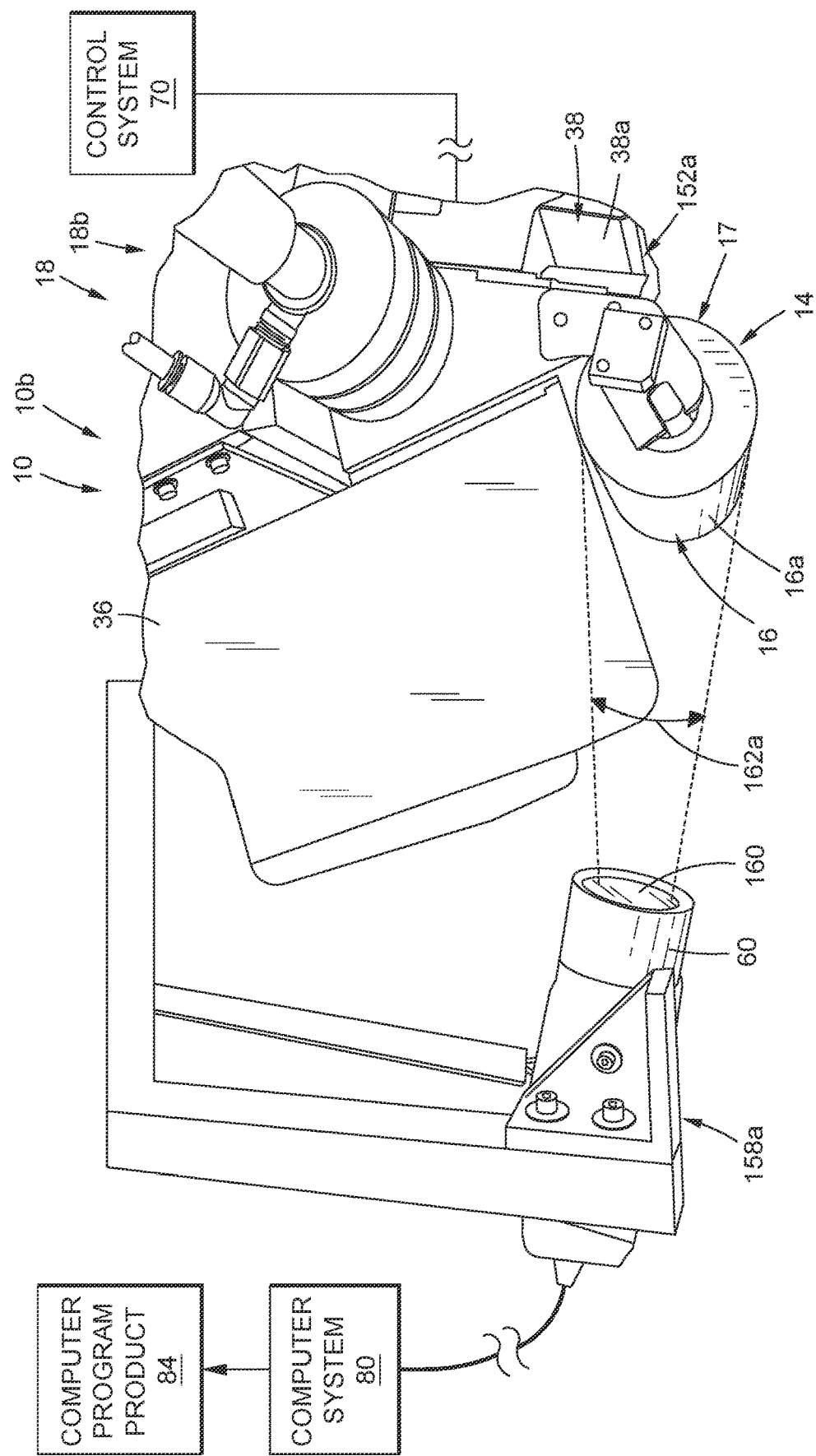
FIG. 4A is an illustration of a perspective side view of another version of a system for in-process monitoring of a compaction roller of a composite layup machine.
Figure 4B:
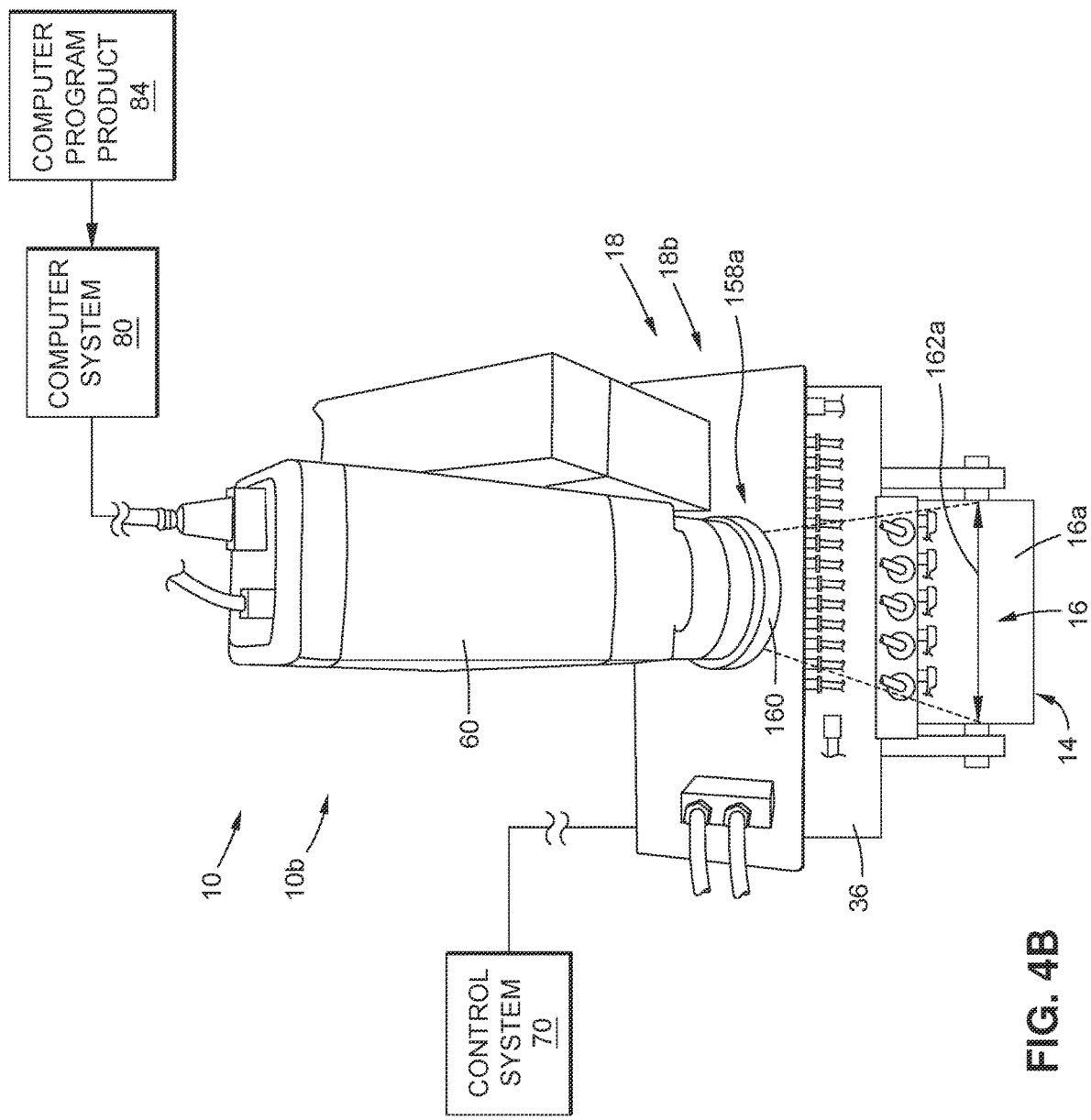
FIG. 4B is an illustration of a perspective back view of the system of FIG. 4A.
Figure 5:
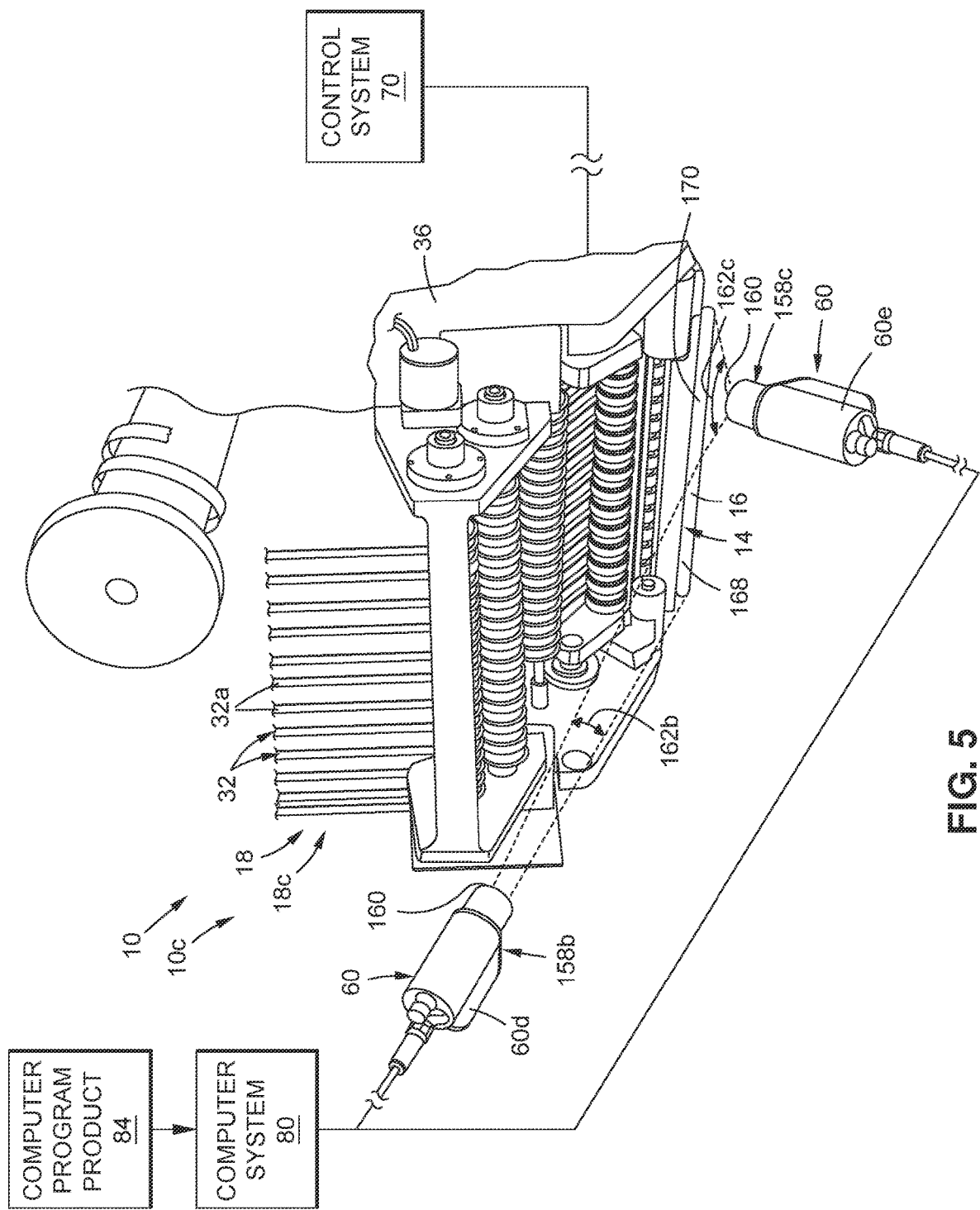
FIG. 5 is an illustration of a perspective back view of yet another version of a system for in-process monitoring of a compaction roller of a composite layup machine.

In one version, as shown in FIGS. 3 and 4A-4B, one IR camera 60 is mounted or attached to the composite layup machine 18 at a position 158, or a position 158a, respectively, that is aft of, or behind, the back side 16 of the compaction roller 14. In another version, as shown in FIG. 5, two IR cameras 60 are mounted or attached to the composite layup machine 18 at respective positions 158b, 158c, that are aft of, or behind, the back side 16 of the compaction roller 14. The system 10 may also use more than two IR cameras 60 positioned aft of, or behind, the back side 16 of the compaction roller 14. When there are two or more IR cameras 60, the two or more IR cameras 60 are synchronized together, to obtain two or more IR images 62 that are configured to be merged together in a computer software 146 (see FIG. 2) of a computer system 80 (see FIGS. 1B, 2).

As shown in FIG. 1A, the system 10 further comprises a control system 70. The control system 70 is configured to control, and controls, the composite layup machine 18. The control system 70 comprises one or more controllers 72 (see FIG. 1A). Each controller 72 is configured to adjust, and adjusts, based on one or more of, the one or more temperature profiles 24 (see FIG. 1B), such as the one or more identified temperature profiles (TP(S)) 24a (see FIG. 1B), and at least one layup condition 74 (see FIG. 1B), one or more of, the compaction speed 54 of the compaction roller 14, the compaction pressure 56 applied by the compaction roller 14, and the temperature output 58 of the heater 38, to limit the material 34, such as the composite material 34a, of the one or more tows 32, such as the composite tows 32a, from adhering to a surface 76 (see FIG. 3) of the compaction roller 14, and to avoid the material 34, such as the composite material 34a, from wrapping around all or part of a circumference 78 (see FIG. 3) of the compaction roller 14.

Thus, one of the one or more controllers 72 is configured to adjust or modify, and adjusts or modifies, at least one of the compaction speed 54 of the compaction roller 14, the compaction pressure 56 applied by the compaction roller 14, or the temperature output 58 of the heater 38, when it is determined that one or more layup conditions 74 (see FIG. 1B) are present. In some illustrative examples, one of the one or more controllers 72 also controls maneuvering of the composite laying head 36 within the manufacturing environment 20.

As shown in FIG. 1B, the system 10 further comprises the computer system 80 having one or more computers 82. As shown in FIG. 1B, the computer system 80 further comprises an analyzer 86, such as a composite analyzer 86a. The analyzer 86, such as the composite analyzer 86a, is configured to identify, and identifies, based on the one or more IR images 62, one or more temperature profiles 24, or thermal artifacts, of the compaction roller 14, to obtain one or more identified temperature profiles 24a. Identifying the one or more temperature profiles 24 of the compaction roller 14, based on the one or more IR images 62, comprises identifying the one or more temperature profiles 24 of the back side portion 16a of the back side 16 of the compaction roller 14, to obtain one or more identified temperature profiles 24a, wherein the one or more tows 32, such as the one or more composite tows 32a, are in contact with the compaction roller 14.

The analyzer 86, such as the composite analyzer 86a, is further configured to enable, and enables, analyzing the one or more identified temperature profiles 24a, to determine one or more of, the layup quality 26 of the composite layup 30, and the heat history 28 of the composite layup 30. In some illustrative examples, the analyzer 86, such as the composite analyzer 86a, analyzes each of the one or more IR images 62, to determine the layup quality 26 of the composite layup 30, and/or the heat history 28 of the composite layup 30. In some illustrative examples, the analyzer 86, such as the composite analyzer 86*a*, analyzes only a portion of the one or more IR images 62.

The one or more identified temperature profiles 24*a* are used to determine at least one layup condition 74 of the composite layup 30. As shown in FIG. 1B, the at least one layup condition 74 comprises one or more of, a layup defect 88, foreign object debris (FOD) 90, a tape tack quality 92, or another suitable layup condition. As further shown in FIG. 1B, the layup defect 88 comprises a tow twist 88*a*, a misaligned tow end 88*b*, a missing tow 88*c*, a tow fold 88*d*, a fuzzball 88*e*, a gap 88*f*, an overlap 88*g*, or another suitable layup defect.

A tow twist 88*a* is a tow 32 that is misshapen and twisted, as it is laid down by the composite laying head 36 on the substrate 42. A misaligned tow end 88*b* is an end of a tow 32 that is cut or added by the composite layup machine 18 that does not align with or match an edge of the part when it is laid down on the substrate 42, and occurs where the compaction roller 14 continues to roll and rolls on an edge between a portion of the tow 32 that was laid on the substrate 42, and a surface 156 (see FIG. 3), such as a metallic surface, of the substrate 42. A missing tow 88*c* is a tow 32 that does not feed out or drop from the composite laying head 36 and does not get laid down on the substrate 42. A missing tow 88*c* may also be referred to as a dropped tow. A tow fold 88*d* is a tow 32 or an edge of a tow 32 that folds over on itself as it is laid down by the composite laying head 36 on the substrate 42. A gap 88*f* is an open area between two tows 32, where a tow 32 does not get laid down properly by the composite laying head 36 on the substrate 42, resulting in a gap 88*f* formed between the tow 32 and an adjacent tow.

As used herein, "fuzzball" means a buildup of stray fibers and resin that accumulates in a composite laying head as it is running, and that gets deposited on, or falls on, a substrate, a part, or on one of the tows. If the compaction roller 14 rolls over the fuzzball 88*e* that is created in the composite laying head 36 and that falls on the substrate 42, the part, or on the tow 32, a thermal signature 94 (see FIG. 1B) of the fuzzball 88*e* can show up on the infrared image 62. The fuzzball 88*e* is a layup defect 88 but is also a type of foreign object debris 90. However, the fuzzball 88*e* has a temperature profile 24 and a thermal signature 94 (see FIG. 1B) that is very different from the temperature profiles 24 and thermal signatures 94 of other types of foreign object debris 90.

As shown in FIG. 1B, the tape tack quality 92 includes a good tack quality 92*a*, or a poor tack quality 92*b*. The tape tack quality 92 may also comprise other types of tape tack qualities. Tack 22 (see FIG. 1A) is a description of the strength of the bond between the tows 32, such as the composite tows 32*a*, and the substrate 42. Tack 22 is affected by temperature 68 of the tows 32, such as the composite tows 32*a*, laid down on the substrate 42. Tack 22 is also affected by contact between the tows 32, such as the composite tows 32*a*, and the substrate 42. Tack 22 may be measured in Newtons. Tack 22 may vary depending upon the type of material 34, such as composite material 34*a*, of the tows 32, such as the composite tows 32*a*, a humidity 96 (see FIG. 1A) of the manufacturing environment 20, and a temperature 98 (see FIG. 1A) of the manufacturing environment 20. Tack 22 may also be affected by storage conditions of the tows 32, such as the composite tows 32*a*, manufacturing conditions for the tows 32, such as the composite tows 32*a*, and laydown time for the tows 32, such as the composite tows 32*a*.

Determining the at least one layup condition 74 of the composite layup 30, based on the one or more identified temperature profiles 24*a*, may comprise identifying a size 100 (see FIG. 1B) of the at least one layup condition 74, based on the one or more IR images 62, and determining if the size 100 of the at least one layup condition 74 is greater than a threshold size 102 (see FIG. 1B), and receiving an indication 104 (see FIG. 1B) to a user interface 106 (see FIG. 1B), when the size 100 of the at least one layup condition 74 is greater than the threshold size 102. The threshold size 102 is based on a known reference standard size 108 (see FIG. 1B). Data for the known reference standard size 108 includes at least one of, a specification requirement for the threshold size 102, infrared images 62 during lay-up, ultrasound inspection data, or visual inspection data.

The indication 104 to the user interface 106 may comprise an alert, a notification, an alarm, or another suitable indication that may be audible, visual, or vibratory in nature. When the size 100 of the layup condition 74 is below the threshold size 102, such information is filtered out, and typically, no indication 104 to the user interface 106 is provided.

As shown in FIG. 1B, a machine vision 110 may be used to identify the at least one layup condition 74, and to automatically alert or notify, such as with the indication 104, the user interface 106 of the computer system 80 of the at least one layup condition 74. As used herein, "machine vision" means the ability of a computer to see, and includes a technology and a method used to extract information from an image on an automated basis, where the information extracted can be a simple good-part/bad-part signal, or a complex set of data such as an identity, a position, and an orientation of each object in an image.

After identifying the one or more temperature profiles 24 of the compaction roller 14, based on the one or more IR images 62, to obtain one or more identified temperature profiles 24*a*, one of the one or more computers 82 and the computer program product 84 (see FIG. 2) may be used to generate an aggregate depiction 112 (see FIG. 1B) of two or more identified temperature profiles 24*a* of the compaction roller 14, to enable a comparison 114 (see FIG. 1B) of the two or more identified temperature profiles 24*a* to each other.

As shown in FIG. 1B, for example, the analyzer 86, such as the composite analyzer 86*a*, the IR images 62, and the layup conditions 74 are all present on the computer system 80. In some illustrative examples, at least one of the analyzer 86, such as the composite analyzer 86*a*, the IR images 62, or the layup conditions 74 may be present on a different computer system. As another example, although the computer system 80 is depicted within the manufacturing environment 20, the computer system 80 may be present in any desirable location. In some illustrative examples, the computer system 80 is present outside of the manufacturing environment 20.

Now referring to FIG. 2, FIG. 2 is an illustration of a block diagram showing an exemplary version of the computer system 80 of FIG. 1B in more detail. The computer system 80 is used with one or more versions of the system 10 (see FIG. 1A), the method 200 (see FIG. 6), and the method 220 (see FIG. 7) of the disclosure. The computer system 80 may be used to implement the analyzer 86 (see FIG. 1B), such as the composite analyzer 86*a* (see FIG. 1B).

In this illustrative example, as shown in FIG. 2, the computer system 80 comprises a data bus 116, such as a communications framework, which provides communications between one or more computers 82, storage devices 118 including a computer memory 120 and a persistent storage 122, an associative memory 124, one or more computer communications devices 126, one or more input/output units 128, and a display 130.

As shown in FIG. 2, the computer system 80 comprises the one or more computers 82, including one or more processor devices 132, and an operating system 134. The computer system 80 is used to implement the one or more computers 82. The one or more computers 82 or the one or more processor devices 132 may be configured to control one or more functions of one or more elements of the composite analyzer 86*a* through the computer program product 84 stored on the storage devices 118. The one or more computers 82 or one or more processor devices 132 serve to execute instructions for the computer program product 84 that may be loaded into the computer memory 120. The processor devices 132 may be a number of processors, a multi-processor core, or some other type of processor, depending on the particular implementation.

As shown in FIG. 2, the computer system 80 further comprises the storage devices 118, including the computer memory 120 and the persistent storage 122. The storage device 118 is any piece of hardware that is capable of storing information, such as, for example, without limitation, at least one of data, program code in functional form, or other suitable information either on a temporary basis, a permanent basis, or both on a temporary basis and a permanent basis. The computer memory 120 may comprise one or more of a random access memory (RAM), including dynamic and/or static RAM, on-chip or off-chip cache memory, or any other suitable volatile or non-volatile computer memory storage device. The persistent storage 122 may comprise one or more of a flash memory, a hard drive, a solid state hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage. The media used by the persistent storage 122 also may be removable. For example, a removable hard drive may be used for the persistent storage 122.

As shown in FIG. 2, the computer system 80 further comprises the one or more computer communications devices 126, such as networking communications devices 136, for linking the system 10 (see FIG. 1A), for example, to one or more separate systems. The networking communications devices 136 comprise network links between various computers and devices connected together within a network data processing system, for example, via wire connections, wireless communication links, fiber optic cables, coaxial cables, or other suitable network connections, and that connect to a network, a server, the Internet, or another system or device.

The one or more computer communications devices 126 are configured to provide communications in accordance with any of a number of wired or wireless communication standards. The one or more computers 82 or one or more processor devices 132 are configured to facilitate communications, via the one or more computer communications devices 126 by, for example, controlling hardware included within the one or more computer communications devices 126. The one or more computer communications devices 126 include, for example, one or more antennas, a transmitter, a receiver, a transceiver and/or supporting hardware, including, for example, a processor for enabling communications.

As shown in FIG. 2, the computer system 80 further comprises the one or more input/output units 128, the display 130, and a power supply 138. The one or more input/output units 128 provide for the input and output of data with other devices connected to the computer system 80, such as, the user interface 106 (see FIG. 1B). The one or more input/output units 128 may comprise such devices as a keyboard, a mouse, a joystick, or other suitable input/output devices. For example, the one or more input/output units 128 provide a connection for input though a keyboard and mouse, or send output to a printer, or other device.

The display 130 provides a mechanism to display information to a user. The user interface 106 (see FIG. 1B), which, in one version, is in the form of the display 130, provides the means to display data to a user, a separate automated system, automated computer program, automated apparatus, or automated device, or another suitable separate system, program, or device. The power supply 138 of the computer system 80 comprises batteries, electricity, or other power supply elements.

As shown in FIG. 2, the computer program product 84 is used in the computer system 80. Instructions for at least one of, the operating system 134, applications, or programs may be located in the storage devices 118, which are in communication with the one or more computers 82 and the one or more processor devices 132, via the data bus 116. The processes of the different examples are be performed by the one or more computers 82 and/or one or more processor devices 132 using computer-implemented instructions, which may be located in the computer memory 120.

These instructions are referred to as system logic 140 (see FIG. 2), a part of the computer program product 84. As shown in FIG. 2, the system logic 140 includes one or more of, an algorithm 142, a program code 144, a computer software 146, a computer firmware 148, or another suitable system logic. As shown in FIG. 2, the computer program product 84 further includes a computer readable medium 150. The computer readable medium 150 comprises a computer readable storage media 150*a* (see FIG. 2), a computer readable signal media 150*b* (see FIG. 2), or another suitable computer readable medium. In this illustrative example, the computer readable storage media 150*a* is a physical or tangible storage device used to store, for example, program code 144 rather than a medium that propagates or transmits program code 144.

Alternatively, program code 144 may be transferred to the computer system 80 using the computer readable signal media 150*b*. The computer readable signal media 150*b* may be, for example, a propagated data signal containing program code 144. For example, the computer readable signal media 150*b* may be at least one of, an electromagnetic signal, an optical signal, or any other suitable type of signal. These signals may be transmitted over at least one of the computer communications devices 126 or networking communications devices 136.

The system logic 140, including the algorithm 142, the program code 144, the computer software 146, and/or the computer firmware 148, are stored in, and retrieved from, the computer readable storage media 150*a*, and loaded into the one or more computers 82, the one or more processor devices 132, or another programmable device, to configure and direct the one or more computers 82, the one or more processor devices 132, or other programmable apparatus to execute operations to be performed on or by the one or more computers 82, the one or more processor devices 132, or other programmable apparatus, and to function in a particular way to generate a particular apparatus or article of manufacture. Execution of the system logic 140, including the algorithm 142, the program code 144, the computer software 146, and/or the computer firmware 148, produces a computer-implemented system, process, or method, such that the system logic 140, including the algorithm 142, the program code 144, the computer software 146, and/or the computer firmware 148, executed by the one or more computers 82, one or more processor devices 132, or other programmable apparatus, provide operations for implementing the functions disclosed herein.

The different components illustrated for the computer system 80 are not meant to provide architectural limitations to the manner in which different examples may be implemented. The different illustrative examples may be implemented in the computer system 80, including components in addition to, or in place of, those illustrated for the computer system 80. Other components shown in FIG. 2 can be varied from the illustrative examples shown. The different examples may be implemented using any hardware device or system capable of running the system logic 140, including the algorithm 142, the program code 144, the computer software 146, and/or the computer firmware 148.

Now referring to FIG. 3, FIG. 3 is an illustration of a side view of a version of a system 10, such as in the form of system 10*a*, for in-process monitoring 12 (see FIG. 1A) of the compaction roller 14 of the composite layup machine 18. The composite layup machine 18 comprises an Automated Fiber Placement (AFP) machine 18*a* (see FIG. 3). As shown in FIG. 3, the composite layup machine 18 has a composite laying head 36 with a compaction roller 14 attached to the composite laying head 36, and an infrared (IR) camera 60 mounted to the composite laying head 36. As shown in FIG. 3, the system 10, such as in the form of system 10*a*, further comprises a heater 38, such as in the form of infrared (IR) heater 38*a*, mounted to the composite laying head 36, at a position 152 that is forward of the front side 17 of the compaction roller 14. As shown in FIG. 3, the system 10, such as in the form of system 10*a*, further comprises a substrate 42 for receiving tows 32, such as the composite tows 32*a*.

As shown in FIG. 3, the composite laying head 36 moves in direction 154 to lay down the tows 32, such as the composite tows 32*a*, on the surface 156 of the substrate 42. As the composite laying head 36 moves in direction 154, the heater 38, such as in the form of IR heater 38*a*, heats the surface 156 of the substrate 42, prior to the tows 32, such as the composite tows 32*a*, being laid down onto the surface 156 of the substrate 42 and compacted by the compaction roller 14.

FIG. 3 shows one IR camera 60 mounted to the composite laying head 36 at the position 158 that is aft of, or behind, the back side 16 of the compaction roller 14. As shown in FIG. 3, a lens 160 of the IR camera 60 is directed at the back side portion 16*a* of the back side 16 of the compaction roller 14, and the IR camera 60 has a field of view 162 of the back side portion 16*a* of the back side 16 of the compaction roller 14. The IR camera 60 is positioned and directed behind the compaction roller 14, and the IR camera 60 is desirably positioned to have a best resolution possible, while containing the back side 16 of the compaction roller 14 within the field of view 162. Although FIG. 3 shows the IR camera 60 at position 158, the IR camera 60 may be positioned at another desirable position to image a back side portion 16*a* of the back side 16 of the compaction roller 14, while the tows 32, such as the composite tows 32*a*, are being laid down onto the substrate 42. Further, although FIG. 3 shows one IR camera 60, two or more IR cameras 60 may be positioned and directed at the back side portion 16*a* of the back side 16 of the compaction roller 14.

Focusing the IR camera 60 on the back side 16 of the compaction roller 14 enables monitoring of the compaction roller 14, and because there are no, or minimal, odd or unusual shifts in the field of view 162 of the IR camera 60, the monitoring has an improved and greater consistency than monitoring the front side 17 of the compaction roller 14, or monitoring other areas of the manufacturing environment 20 (see FIG. 1A) or composite layup machine 18 (see FIG. 1A). The compaction roller's 14 intimate contact with the tows 32, such as the composite tows 32*a*, at a point of compaction 164 (see FIG. 3) allows for any temperature change or thermal change in the tows 32, such as the composite tows 32*a*, to be imprinted, in the form of one or more imprints 166 (see FIGS. 1B, 8A), also referred to as thermal imprints 167 (see FIGS. 1A, 8A), on the back side portion 16*a* of the back side 16 of the compaction roller 14 for the IR camera 60 to view. The imprints 166, or thermal imprints 167, represent the transfer of heat 40 from the tows 32, such as the composite tows 32*a*, to the surface 76 (see FIG. 3) of the compaction roller 14. The imprint 166 is a thermal imprint 167 rather than a physical imprint on the compaction roller 14. Using one or more IR cameras 60 to view the back side 16 of the compaction roller 14 also avoids any issues of reflected energy from the heater 38.

As shown in FIG. 3, the system 10, such as in the form of system 10*a*, further comprises the control system 70 coupled to the composite layup machine 18. As shown in FIG. 3, the system 10, such as in the form of system 10*a*, further comprises the computer system 80 coupled to the IR camera 60, and the computer program product 84 coupled to the computer system 80.

Now referring to FIGS. 4A-4B, FIG. 4A is an illustration of a perspective side view of another version of a system 10, such as in the form of system 10*b*, for in-process monitoring 12 (see FIG. 1A) of the compaction roller 14 of the composite layup machine 18. FIG. 4B is an illustration of a perspective back view of the system 10, such as in the form of system 10*b*, of FIG. 4A. As shown in FIGS. 4A-4B, the system 10, such as in the form of system 10*b*, comprises the composite layup machine 18, such as in the form of a test composite layup machine 18*b*, used in a laboratory testing environment, and having the composite laying head 36 with the compaction roller 14 attached to the composite laying head 36, and the infrared (IR) camera 60 mounted to the composite laying head 36. FIG. 4A further shows the heater 38, such as in the form of infrared (IR) heater 38*a*, mounted to the composite laying head 36 at a position 152*a* that is forward of the front side 17 of the compaction roller 14.

As shown in FIGS. 4A-4B, one IR camera 60 is mounted to the composite laying head 36 at a position 158*a* that is aft of, or behind, the back side 16 of the compaction roller 14. As shown in FIGS. 4A-4B, the lens 160 of the IR camera 60 is directed at the back side portion 16*a* of the back side 16 of the compaction roller 14, and the IR camera 60 has a field of view 162*a* of the back side portion 16*a* of the back side 16 of the compaction roller 14. The IR camera 60 is desirably positioned to have a best resolution possible, while containing the back side 16 of the compaction roller 14 within the field of view 162*a*. Although FIGS. 4A-4B shows the IR camera 60 at position 158*a*, the IR camera 60 may be positioned at another desirable position to image the back side 16 of the compaction roller 14. Further, although FIGS. 4A-4B show one IR camera 60, two or more IR cameras 60 may be positioned and directed at the back side 16 of the compaction roller 14.

As shown in FIGS. 4A-4B, the system 10, such as in the form of system 10*b*, further comprises the control system 70 coupled to the composite layup machine 18. As shown in FIGS. 4A-4B, the system 10, such as in the form of system 10*b*, further comprises the computer system 80 coupled to the IR camera 60, and the computer program product 84 coupled to the computer system 80. The tows 32 (see FIG. 1A), such as the composite tows 32*a* (see FIG. 1A), and the substrate 42 (see FIG. 1A) are not shown in FIGS. 4A-4B.

Now referring to FIG. 5, FIG. 5 is an illustration of a perspective back view of yet another version of a system 10, such as in the form of system 10*c*, for in-process monitoring 12 (see FIG. 1A) of the compaction roller 14 of the composite layup machine 18. As shown in FIG. 5, the system 10, such as in the form of system 10*c*, comprises the composite layup machine 18, such as in the form of a production composite layup machine 18*c*, used in a manufacturing environment 20 (see FIG. 1A), and having the composite laying head 36 with the compaction roller 14 attached to the composite laying head 36, and two infrared (IR) cameras 60 coupled to the composite laying head 36 of the composite layup machine 18.

As shown in FIG. 5, two IR cameras 60, including a first IR camera 60*d* and a second IR camera 60*e*, are both positioned aft of, or behind, the back side 16 of the compaction roller 14. The first IR camera 60*d* is positioned at a position 158*b* that is oriented, so that the lens 160 of the first IR camera 60*d* is directed at a first half 168, or left half, of the compaction roller 14. The first IR camera 60*d* has a field of view 162*b* of the first half 168 of the back side 16 of the compaction roller 14. The second IR camera 60*e* is positioned at a position 158*c* that is oriented, so that the lens 160 of the second IR camera 60*e* is directed at a second half 170, or right half, of the compaction roller 14. The second IR camera 60*e* has a field of view 162*c* of the second half 170 of the back side 16 of the compaction roller 14.

As shown in FIG. 5, the system 10, such as in the form of system 10*c*, further comprises the control system 70 coupled to the composite layup machine 18. As shown in FIG. 5, the system 10, such as in the form of system 10*c*, further comprises the computer system 80 coupled to both of the two IR cameras 60, and shows the computer program product 84 coupled to the computer system 80. FIG. 5 further shows tows 32, such as the composite tows 32*a*, held in tension by the composite laying head 36. The heater 38 (see FIG. 1A) and the substrate 42 (see FIG. 1A) are not shown in FIG. 5. Due to a larger size and width of certain compaction rollers 14, two or more IR cameras 60 may be used to capture IR images 62 of all of the back side portion 16*a* of the back side 16 of the compaction roller 14.

Figure 6:
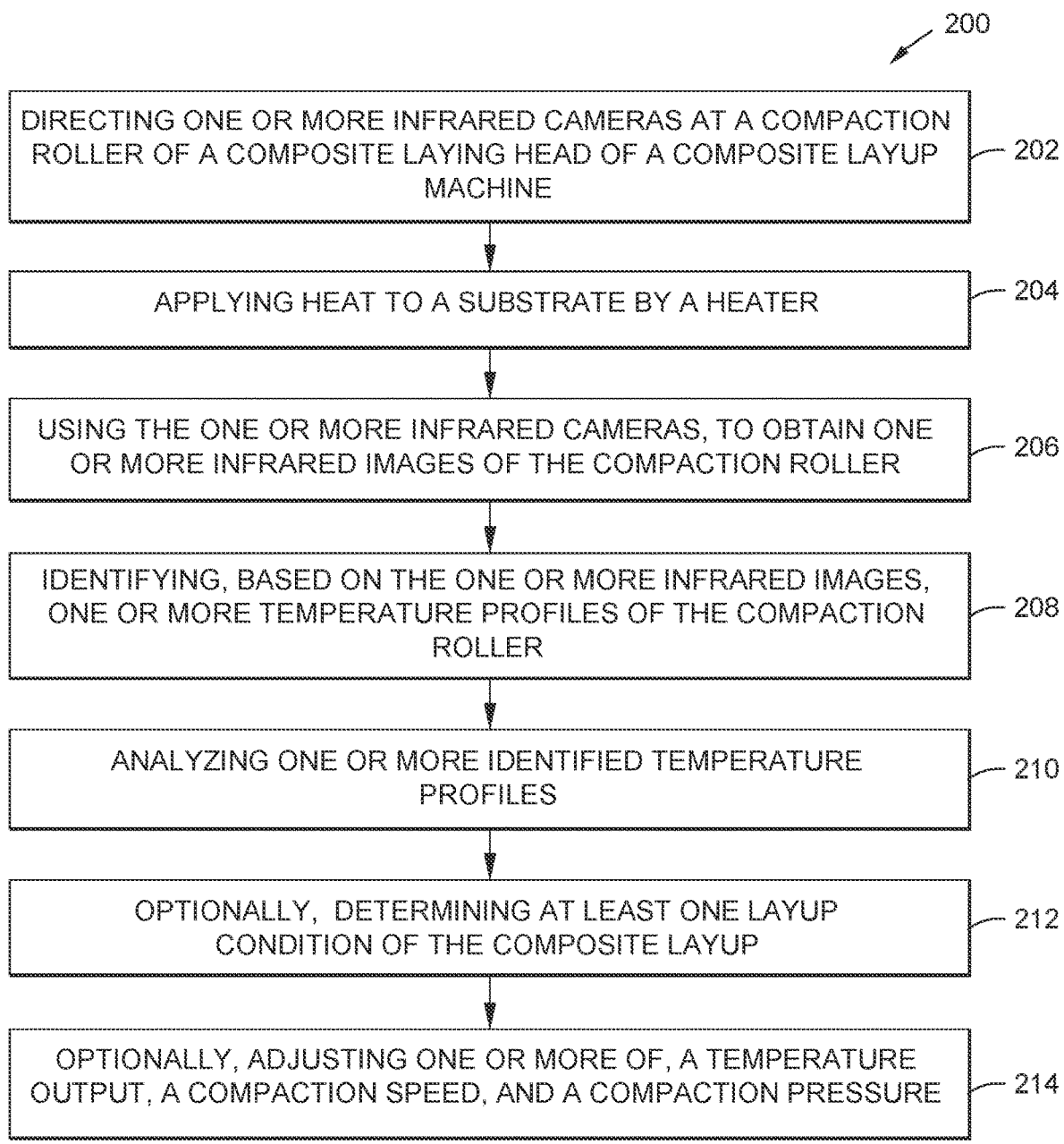
FIG. 6 is an illustration of a flow diagram of a version of a method of the disclosure.

Now referring to FIG. 6, FIG. 6 is an illustration of a flow diagram of a version of a method 200, in accordance with an example of the disclosure. The blocks in FIG. 6 represent operations and/or portions thereof, or elements, and lines connecting the various blocks do not imply any particular order or dependency of the operations or portions thereof, or elements. FIG. 6 and the disclosure of the steps of the method 200 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 6, the method 200 comprises the step of directing 202 one or more infrared (IR) cameras 60 (see FIGS. 1A-1B) at the compaction roller 14 (see FIG. 1A) of the composite laying head 36 (see FIG. 1A) of the composite layup machine 18 (see FIG. 1A). The composite layup machine 18 comprises one or more of, an Automated Fiber Placement (AFP) composite layup machine 18*a* (see FIG. 3), a test composite layup machine 18*b* (see FIGS. 4A-4B), a production composite layup machine 18*c* (see FIG. 5), or another suitable composite layup machine. The one or more IR cameras 60 are mounted aft of, or behind, the back side 16 (see FIG. 1A) of the compaction roller 14. The IR camera 60 comprises a photographic IR camera 60*a* (see FIG. 1A), a video IR camera 60*b* (see FIG. 1A), a combination photographic/video IR camera 60*c* (see FIG. 1A), or another suitable IR camera.

As shown in FIG. 6, the method 200 further comprises the step of applying 204 heat 40 (see FIG. 1A) to the substrate 42 (see FIG. 1A) by the heater 38 (see FIG. 1A). The heater 38 is mounted forward of the front side 17 (see FIG. 2) of the compaction roller 14. The heater 38 comprises an infrared (IR) heater 38*a* (see FIG. 1A), a laser heater 38*b* (see FIG. 1A), or another suitable heater.

As shown in FIG. 6, the method 200 further comprises the step of using 206 the one or more IR cameras 60, to obtain one or more infrared (IR) images 62 (see FIG. 1A) of the compaction roller 14. The IR images 62 are obtained by the one or more IR cameras 60 during laying down of one or more tows 32, such as one or more composite tows 32*a*, of the composite layup 30 (see FIG. 1A), onto the substrate 42, by the compaction roller 14. The step of using 206 the one or more IR cameras 60, to obtain the one or more IR images 62 of the compaction roller 14, may further comprise using the one or more IR cameras 60, to obtain the one or more IR images 62 comprising one of, one or more infrared (IR) photographic images 62*a* (see FIG. 1A), one or more infrared (IR) video images 62*b* (see FIG. 1A), or another suitable infrared image. The step of using 206 the one or more IR cameras 60, to obtain the one or more IR images 62 of the compaction roller 14, may further comprise using two or more IR cameras 60 that are synchronized, to obtain two or more IR images 62 that are configured to be merged together in a computer software 146 (see FIG. 2) used with the computer 82 (see FIGS. 1B, 2) of the computer system 80 (see FIGS. 1B, 2).

As shown in FIG. 6, the method 200 further comprises the step of identifying 208, based on the one or more IR images 62, one or more temperature profiles 24 (see FIG. 1B) of the compaction roller 14, to obtain one or more identified temperature profiles 24*a* (see FIG. 1B). The step of identifying 208, based on the one or more IR images 62, the one or more temperature profiles 24 of the compaction roller 14 may further comprise, identifying, based on the one or more IR images 62, the one or more temperature profiles 24 of the back side portion 16*a* (see FIG. 1A) of the compaction roller 14, to obtain the one or more identified temperature profiles 24*a*, wherein the one or more tows 32, such as the composite tows 32*a*, are in contact with the compaction roller 14. The method 200 may further comprise, after identifying 208, based on the one or more IR images 62, the one or more temperature profiles 24 of the compaction roller 14, the step of using the computer 82 (see FIGS. 1B, 2) and the computer program product 84 (see FIG. 2), such as computer software 146 (see FIG. 2), to generate the aggregate depiction 112 (see FIG. 1B) of two or more identified temperature profiles 24*a* of the compaction roller 14, to enable a comparison 114 (see FIG. 1B) of the two or more identified temperature profiles 24*a* to each other.

As shown in FIG. 6, the method 200 further comprises the step of analyzing 210 the one or more identified temperature profiles 24*a*. Analyzing 210 the one or more identified temperature profiles 24*a* is done to determine one or more of, the layup quality 26 (see FIG. 1B) of the composite layup 30, and the heat history 28 (see FIG. 1B) of the composite layup 30. The method 200 allows for in-process monitoring 12 (see FIG. 1A) of the back side 16 of the compaction roller 14 of the composite layup machine 18.

As shown in FIG. 6, the method 200 may further comprise, after analyzing 210 the one or more identified temperature profiles 24a, the step of optionally, determining 212, based on the one or more identified temperature profiles 24a, at least one layup condition 74 (see FIG. 1B) of the composite layup 30. The step of determining 212, based on the one or more identified temperature profiles 24a, the at least one layup condition 74 of the composite layup 30, further comprises determining, based on the one or more identified temperature profiles 24a, the at least one layup condition 74 comprising one or more of, a layup defect 88 (see FIG. 1B), foreign object debris (FOD) 90 (see FIG. 1B), a tape tack quality 92 (see FIG. 1B), or another suitable layup condition. The step of determining 212, based on the one or more identified temperature profiles 24a, the at least one layup condition 74 of the composite layup 30, further comprises determining, based on the one or more identified temperature profiles 24a, the at least one layup condition 74, wherein the layup defect 88 comprises, as shown in FIG. 1B, a tow twist 88a, a misaligned tow end 88b, a missing tow 88c, a tow fold 88d, a fuzzball 88e, a gap 88f, an overlap 88g, or another suitable layup defect.

As shown in FIG. 6, the method 200 may further comprise, after determining 212, based on the one or more identified temperature profiles 24a, the at least one layup condition 74 of the composite layup 30, the step of optionally, adjusting 214, based on one or more of, the one or more identified temperature profiles 24a, and the at least one layup condition 74, one or more of, a compaction speed 54 (see FIG. 1A) of the compaction roller 14, a compaction pressure 56 (see FIG. 1A) applied by the compaction roller 14, and a temperature output 58 (see FIG. 1A) of the heater 38 (see FIG. 1A), to limit the material 34 (see FIG. 1B), such as the composite material 34a (see FIG. 1B), of the one or more tows 32, such as the one or more composite tows 32a, adhering to the surface 76 (see FIG. 3) of the compaction roller 14, and to avoid the material 34, such as the composite material 34a, wrapping around all or part of the circumference 78 (see FIG. 3) of the compaction roller 14.

The step of determining 212, based on the one or more identified temperature profiles 24a, the at least one layup condition 74 of the composite layup 30, may further comprise using machine vision 110 (see FIG. 1B), to identify the at least one layup condition 74, and to automatically alert the user interface 106 (see FIG. 1B) of the computer system 80, of the at least one layup condition 74.

The step of determining 212, based on the one or more identified temperature profiles 24a, the at least one layup condition 74 of the composite layup 30, may further comprise identifying the size 100 (see FIG. 1B) of the at least one layup condition 74, based on the one or more IR images 62, determining if the size 100 of the at least one layup condition 74 is greater than the threshold size 102 (see FIG. 1B), wherein the threshold size 102 is based on a known reference standard size 108 (see FIG. 1B), and receiving an indication 104 (see FIG. 1B) to the user interface 106 (see FIG. 1B) of the computer system 80, when the size 100 of the at least one layup condition 74 is greater than the threshold size 102.

Figure 7:
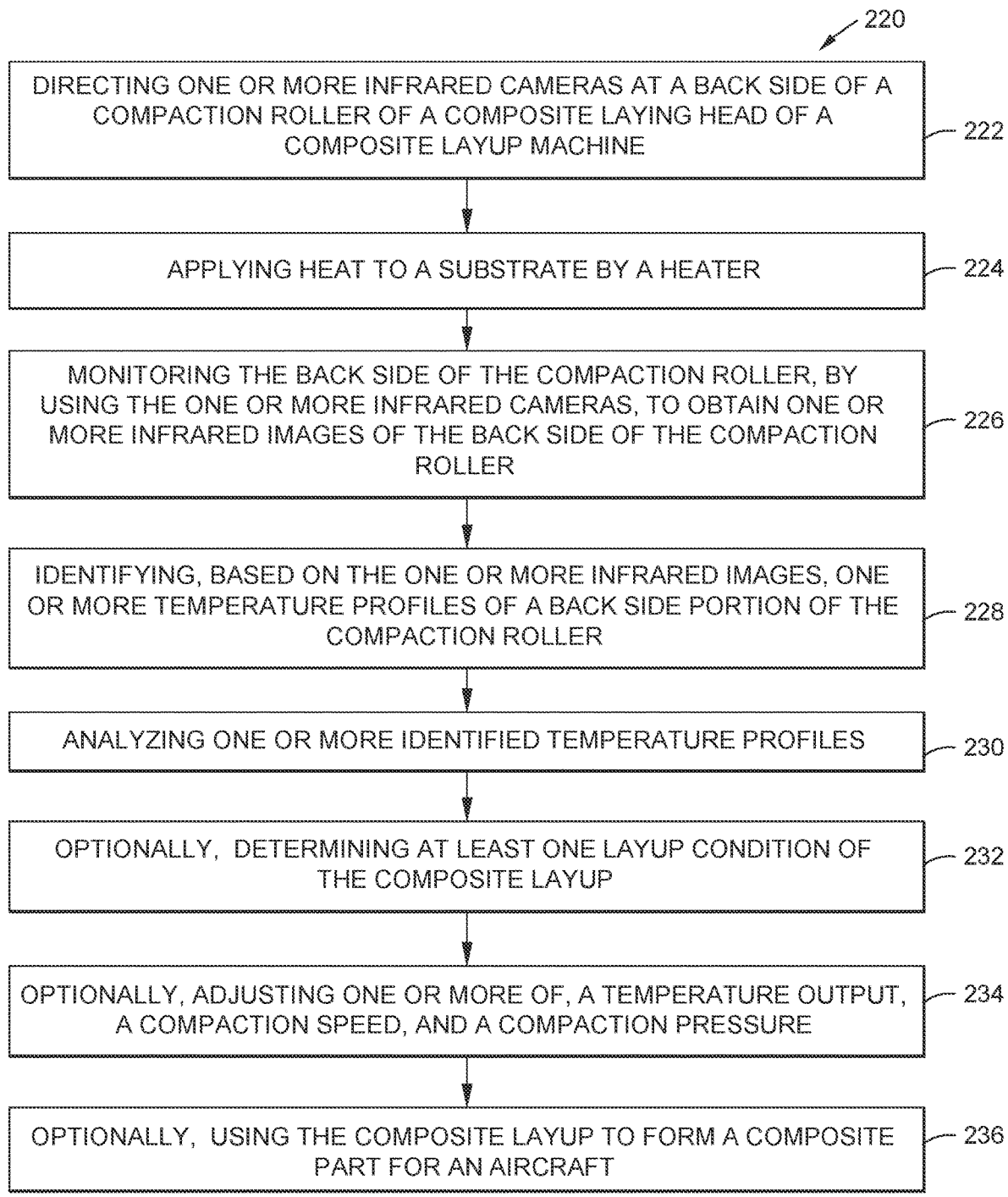
FIG. 7 is an illustration of a flow diagram of a version of a method for in-process monitoring of a compaction roller of a composite layup machine of the disclosure.

Now referring to FIG. 7, FIG. 7 is an illustration of a flow diagram of another version of a method 220, in accordance with an example of the disclosure. In another version of the disclosure, there is provided the method 220 for in-process monitoring 12 (see FIG. 1A) of the compaction roller 14 (see FIG. 1A) of the composite layup machine 18 (see FIG. 1A). The composite layup machine 18 comprises one or more of, the Automated Fiber Placement (AFP) composite layup machine 18a (see FIG. 3), the test composite layup machine 18b (see FIGS. 4A-4B), the production composite layup machine 18c (see FIG. 5), or another suitable composite layup machine.

The blocks in FIG. 7 represent operations and/or portions thereof, or elements, and lines connecting the various blocks do not imply any particular order or dependency of the operations or portions thereof, or elements. FIG. 7 and the disclosure of the steps of the method 220 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 7, the method 220 comprises the step of directing 222 one or more infrared (IR) cameras 60 at the back side 16 (see FIG. 1A) of the compaction roller 14 of the composite laying head 36 (see FIG. 1A) of the composite layup machine 18. The one or more IR cameras 60 are mounted aft of, or behind, the back side 16 of the compaction roller 14.

As shown in FIG. 7, the method 220 further comprises the step of applying 224 heat 40 (see FIG. 1A) to the substrate 42 (see FIG. 1A) by the heater 38 (see FIG. 1A). The heater 38 is mounted forward of the compaction roller 14. The heater 38 may comprise the IR heater 38a (see FIG. 1A), the laser heater 38b (see FIG. 1A), or another suitable heater.

As shown in FIG. 7, the method 220 further comprises the step of monitoring 226 the back side 16 of the compaction roller 14, by using the one or more IR cameras 60, to obtain one or more infrared (IR) images 62 (see FIG. 1A) of the back side 16, such as the back side portion 16a of the back side 16, of the compaction roller 14. The IR images 62 are obtained by the one or more IR cameras 60 during laying down of one or more tows 32, such as the one or more composite tows 32a, of the composite layup 30 (see FIG. 1A), onto the substrate 42, by the compaction roller 14. The IR camera 60 comprises the photographic IR camera 60a (see FIG. 1A), the video IR camera 60b (see FIG. 1A), the combination photographic/video IR camera 60c (see FIG. 1A), or another suitable IR camera.

The step of monitoring 226 the back side 16 of the compaction roller 14, by using the one or more IR cameras 60, may further comprise, monitoring the back side 16 of the compaction roller 14, by using two or more IR cameras 60 that are synchronized, to obtain two or more IR images 62 that are configured to be merged together in computer software 146 (see FIG. 2) of the computer system 80 (see FIG. 2). The step of monitoring 226 the back side 16 of the compaction roller 14, by using the one or more IR cameras 60, may further comprise, monitoring the back side 16 of the compaction roller 14, by using the one or more IR cameras 60, to obtain one or more IR images 62 comprising one of, one or more IR photographic images 62a (see FIG. 1A), one or more IR video images 62b (see FIG. 1A), or another suitable infrared image.

As shown in FIG. 7, the method 220 further comprises the step of identifying 228, based on the one or more IR images 62, one or more temperature profiles 24 (see FIG. 1B) of the back side portion 16a (see FIG. 1A) of the back side 16 of the compaction roller 14, to obtain one or more identified temperature profiles 24a (see FIG. 1B). The one or more tows 32, such as the one or more composite tows 32a, are in contact with the compaction roller 14.

As shown in FIG. 7, the method 220 further comprises the step of analyzing 230 the one or more identified temperature profiles 24a. Analyzing 230 the one or more identified temperature profiles 24a is done to determine one or more of, the layup quality 26 (see FIG. 1B) of the composite layup 30, and the heat history 28 (see FIG. 1B) of the composite layup 30.

As shown in FIG. 7, the method 220 may further comprise, after analyzing 230 the one or more identified temperature profiles 24a, the step of optionally, determining 232, based on the one or more identified temperature profiles 24a, at least one layup condition 74 (see FIG. 1B) of the composite layup 30. The step of determining 232, based on the one or more identified temperature profiles 24a, the at least one layup condition 74 of the composite layup 30, further comprises determining, based on the one or more identified temperature profiles 24a, the at least one layup condition 74 comprising one or more of, a layup defect 88 (see FIG. 1B), foreign object debris (FOD) 90 (see FIG. 1B), a tape tack quality 92 (see FIG. 1B), or another suitable layup condition. The step of determining 232, based on the one or more identified temperature profiles 24a, the at least one layup condition 74 of the composite layup 30, further comprises determining, based on the one or more identified temperature profiles 24a, the at least one layup condition 74, wherein the layup defect 88 comprises, as shown in FIG. 1B, a tow twist 88a, a misaligned tow end 88b, a missing tow 88c, a tow fold 88d, a fuzzball 88e, a gap 88f, an overlap 88g, or another suitable layup defect.

As shown in FIG. 7, the method 220 may further comprise, after determining 232, based on the one or more identified temperature profiles 24a, the at least one layup condition 74 of the composite layup 30, the step of optionally, adjusting 234, based on one or more of, the one or more identified temperature profiles 24a, and the at least one layup condition 74, one or more of, the compaction speed 54 (see FIG. 1A) of the compaction roller 14, the compaction pressure 56 (see FIG. 1A) applied by the compaction roller 14, and the temperature output 58 (see FIG. 1A) of the heater 38, to limit the material 34 (see FIG. 1B), such as the composite material 34a (see FIG. 1B), of the one or more tows 32, such as the one or more composite tows 32a, adhering to the surface 76 (see FIG. 3) of the compaction roller 14, and to avoid the material 34, such as the composite material 34a, wrapping around all or part of the circumference 78 (see FIG. 3) of the compaction roller 14.

As shown in FIG. 7, the method 220 may further comprise, after adjusting 234, based on the one or more of, the one or more identified temperature profiles 24a, and the at least one layup condition 74, the step of optionally, using 236 the composite layup 30 to form a part 48 (see FIG. 15), such as a composite part 48a (see FIG. 15), for a vehicle 50 (see FIG. 15), such as an aircraft 50a (see FIG. 15).

Figure 8A:
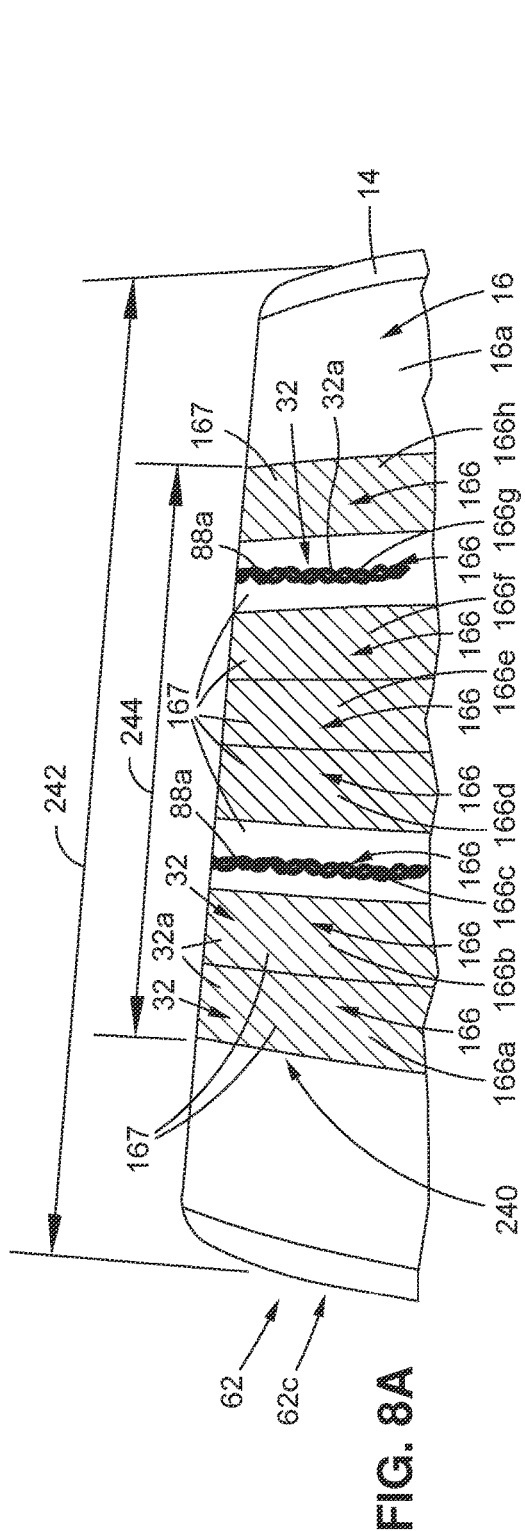
FIG. 8A is an illustration representing a tow twist infrared (IR) image of a region of interest on a back side portion of a compaction roller.

Now referring to FIG. 8A, FIG. 8A is an illustration representing an infrared (IR) image 62, in the form of a tow twist infrared (IR) image 62c, of a region of interest 240 on a back side portion 16a of a back side 16 of a compaction roller 14 of the system 10 (see FIG. 1A). FIG. 8A shows a full width 242 of the compaction roller 14 and shows a width 244 of the region of interest 240.

The region of interest 240 shown in FIGS. 8A, 9A, 10A, 11A, 12A, and 13 includes imprints 166, or thermal imprints 167, of tows 32, such as composite tows 32a, that the compaction roller 14 has made intimate contact with at the point of compaction 164 (see FIG. 3), as the compaction roller 14 rolls over the tows 32, such as the composite tows 32a, as they are laid down on the substrate 42 (see FIG. 3). The compaction roller's 14 intimate contact with the tows 32, such as the composite tows 32a, at the point of compaction 164 (see FIG. 3) allows for any temperature change or thermal change in the tows 32, such as the composite tows 32a, to be imprinted, in the form of imprints 166 on the back side portion 16a of the back side 16 of the compaction roller 14, and for the IR camera 60 to take the IR image 62 of the imprints 166. The imprints 166 represent the transfer of heat 40 (see FIG. 1A) from the tows 32, such as the composite tows 32a, to the surface 76 (see FIG. 3) of the compaction roller 14.

As shown in FIG. 8A, the IR image 62, in the form of the tow twist IR image 62c, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 8A, the first imprint 166a, the second imprint 166b, the fourth imprint 166d, the fifth imprint 166e, the sixth imprint 166f, and the eighth imprint 166h are imprints 166 of the tows 32 that are representative of tows 32 that are good or acceptable. As further shown in FIG. 8A, the third imprint 166c and the seventh imprint 166g are imprints 166 that are representative of tows 32 that have each formed into a tow twist 88a, where the tow 32 is misshapen and twisted, as it was laid down on the substrate 42 and rolled on by the compaction roller 14.

Figure 8B:
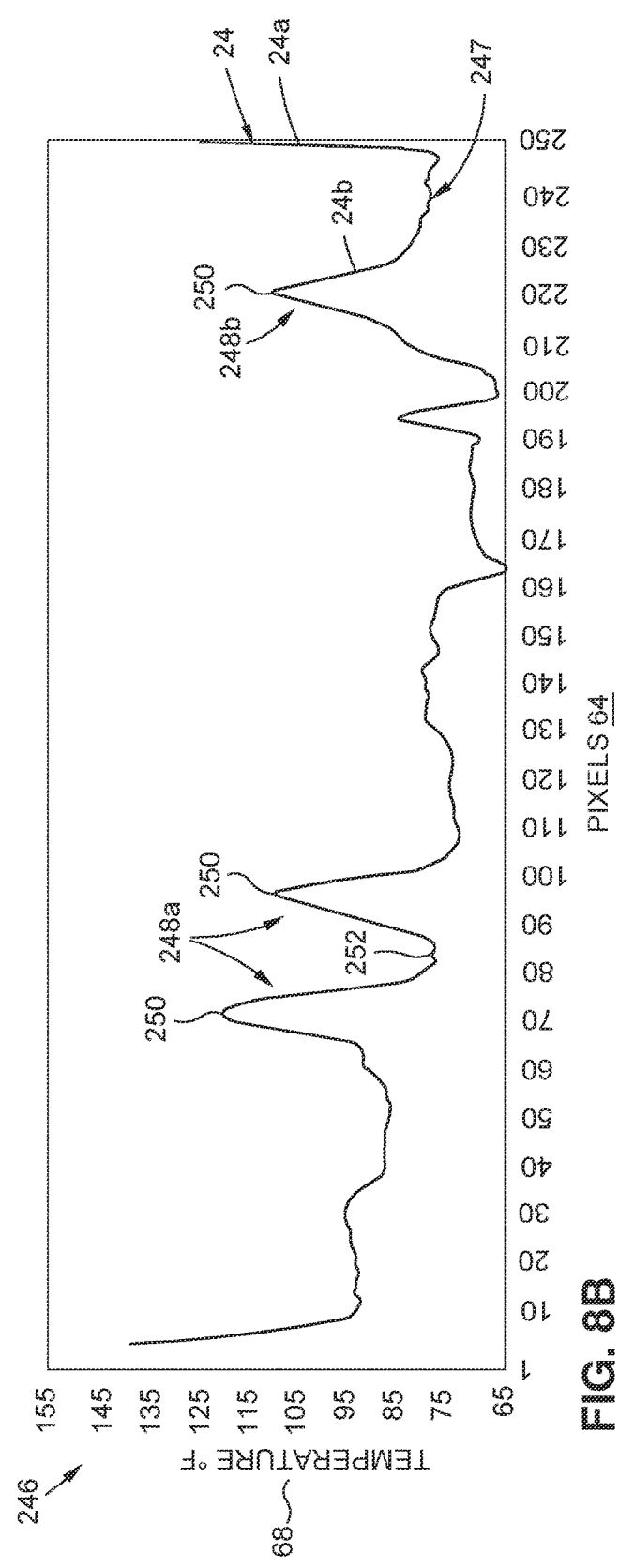
FIG. 8B is an illustration of a graph showing a tow twist temperature profile of the region of interest of FIG. 8A.

Now referring to FIG. 8B, FIG. 8B is an illustration of a graph 246 with a plot 247 of a temperature profile 24, such as an identified temperature profile 24a, in the form of a tow twist temperature profile 24b, of the region of interest 240, of FIG. 8A. The graph 246 shows pixels 64 along the x-axis, and shows temperature 68 of the tows 32, such as the composite tows 32a, in degrees Fahrenheit (° F.), along the y-axis. The plot 247 takes the average from the column of pixels 64 along the width 244 of the region of interest 240 and displays it on the graph 246. This also applies to the graphs in FIGS. 9B, 10B, 11B, and 12B. Further, the compaction roller 14 provides an average of the temperature 68 of the tows 32, via conduction of heat 40 from the substrate 42. In other examples, the region of interest that graphs are obtained from may be in the form of a line rather than a box, where the line provides the data without averaging over a column of pixels, and this may be preferred for detecting smaller and more subtle indications.

As shown in FIG. 8B, the temperature profile 24, in the form of the tow twist temperature profile 24b, shows a first portion 248a with peaks 250 at higher temperatures (120° F., 110° F.) and a valley 252 at a lower temperature (80° F.) between the peaks 250, to indicate the third imprint 166c with the tow twist 88a, in FIG. 8A. As further shown in FIG. 8B, the temperature profile 24, in the form of the tow twist temperature profile 24b, shows a second portion 248b with a peak 250 at a higher temperature (110° F.) to indicate the seventh imprint 166g with the tow twist 88a, in FIG. 8A. The tow twist temperature profile 24b shown in graph 246 may be used to indicate that there is a layup condition 74, for example, a layup defect 88, and viewing the tow twist IR image 62c indicates and verifies that tow twists 88a have occurred at that location of the composite layup 30.

Figure 9A:
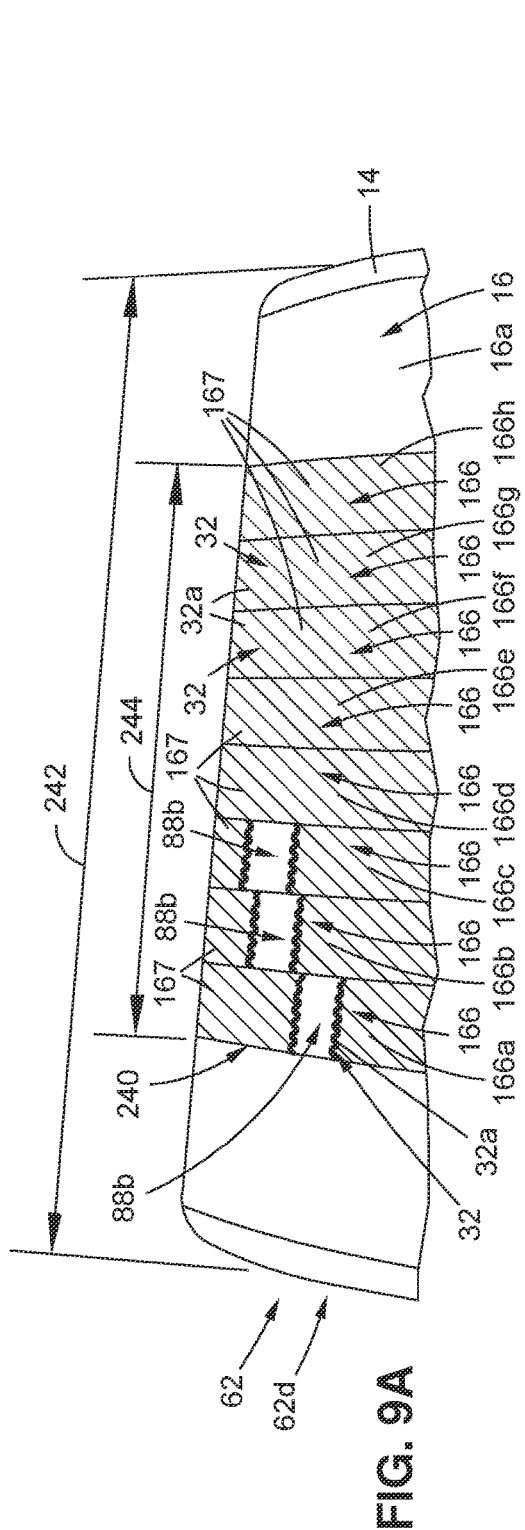
FIG. 9A is an illustration representing a tow end infrared (IR) image of a region of interest on a back side portion of a compaction roller.

Now referring to FIG. 9A, FIG. 9A is an illustration representing an infrared (IR) image 62, in the form of a misaligned tow end infrared (IR) image 62d, of the region of interest 240 on the back side portion 16a of the back side 16 of the compaction roller 14 of the system 10 (see FIG. 1A).

FIG. 9A shows the full width 242 of the compaction roller 14 and shows the width 244 of the region of interest 240. As shown in FIG. 9A, the IR image 62, in the form of the misaligned tow end IR image 62d, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 9A, the first imprint 166a, the second imprint 166b, and the third imprint 166c are imprints 166 of tows 32 that each are representative of misaligned tow ends 88b, where the ends of the tows 32 are cut or added by the composite layup machine 18 do not align with or match an edge of the part when it is laid down on the substrate 42, and occurs where the compaction roller 14 continued to roll and rolled on an edge between the tows 32 that were laid on the substrate 42 (see FIGS. 1A, 3), and the surface 156 (see FIG. 3), such as a metallic surface, of the substrate 42. As further shown in FIG. 9A, the fourth imprint 166d, fifth imprint 166e, sixth imprint 166f, seventh imprint 166g, and eighth imprint 166h are imprints 166 of tows 32 that are representative of tows 32 that are good or acceptable.

Figure 9B:
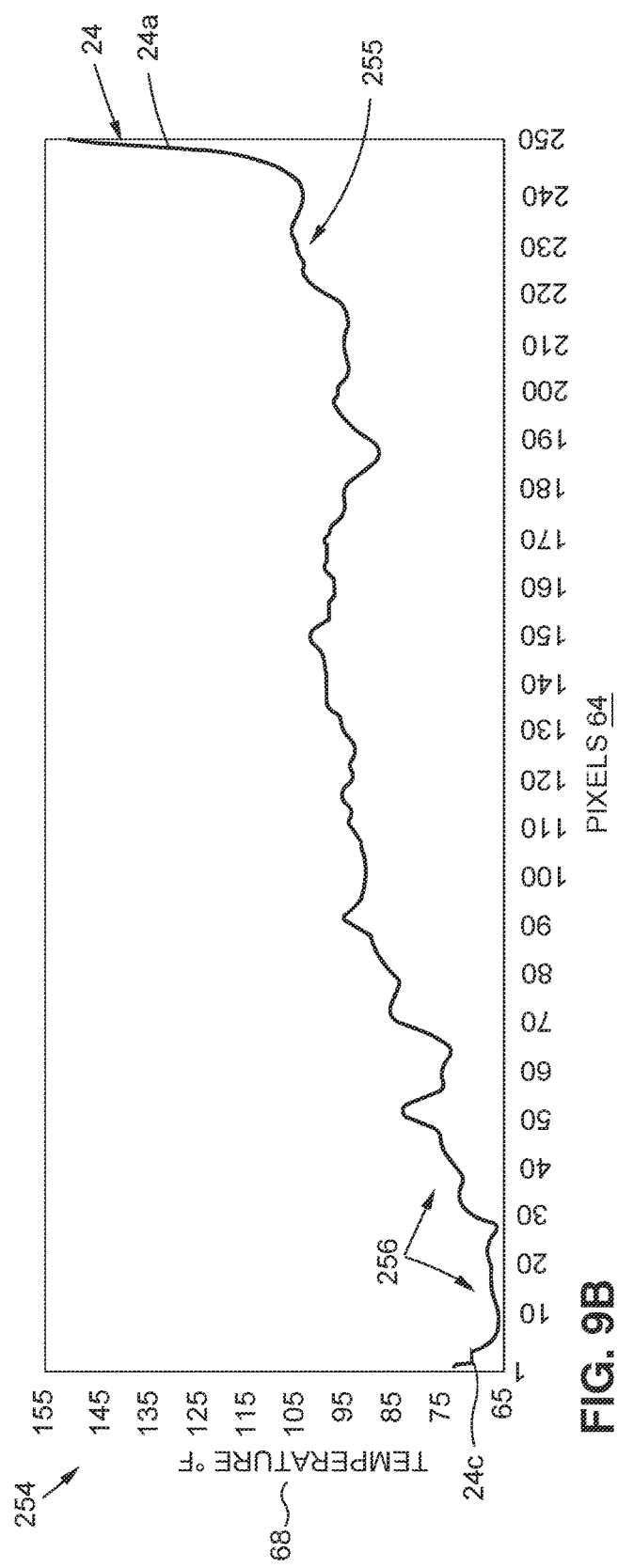
FIG. 9B is an illustration of a graph showing a tow end temperature profile of the region of interest of FIG. 9A.

Now referring to FIG. 9B, FIG. 9B is an illustration of a graph 254 with a plot 255 of a temperature profile 24, such as an identified temperature profile 24a, in the form of a tow end temperature profile 24c, of the region of interest 240, of FIG. 9A. The graph 254 shows pixels 64 along the x-axis, and shows temperature 68 of the tows 32, such as the composite tows 32a, in degrees Fahrenheit (° F.), along the y-axis. As shown in FIG. 9B, the temperature profile 24, in the form of the tow end temperature profile 24c, shows an area 256 at low temperatures (65-75° F.) to indicate the first imprint 166a, the second imprint 166b, and the third imprint 166c with the misaligned tow ends 88b, of FIG. 9A, where the compaction roller 14 made contact with an unheated or cooler portion of the substrate 42 or the tows 32. The tow end temperature profile 24c shown in graph 254 may be used to indicate that there is a layup condition 74, for example, a layup defect 88, and viewing the misaligned tow end IR image 62d indicates and verifies that misaligned tow ends 88b have occurred at that location of the composite layup 30.

Figure 10A:
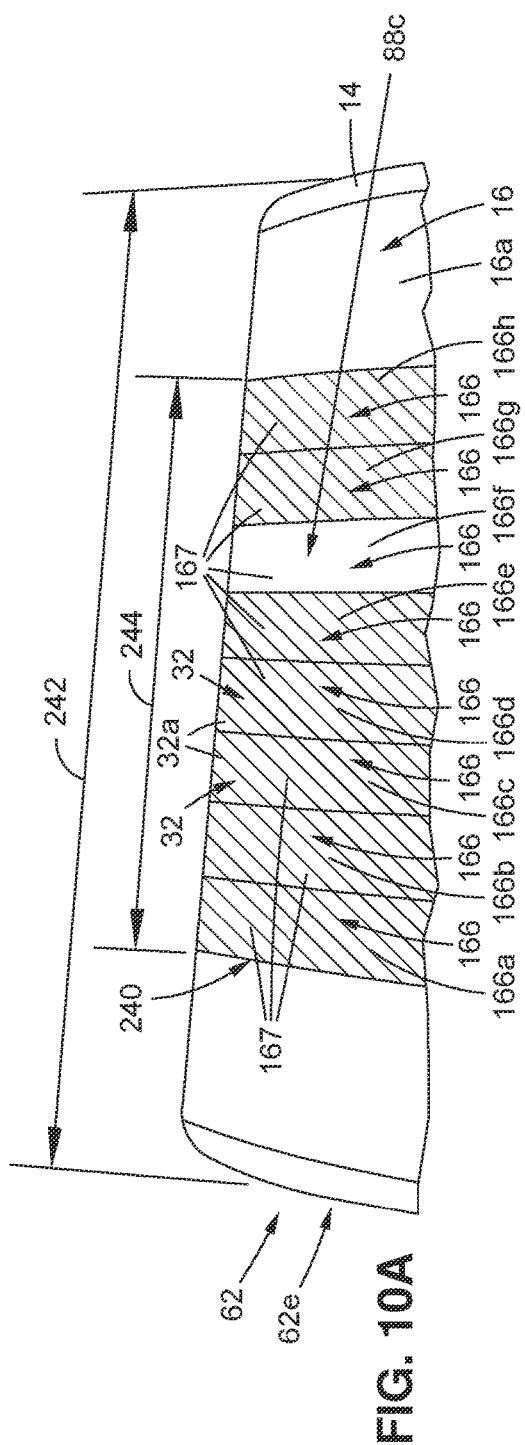
FIG. 10A is an illustration representing a missing tow infrared (IR) image of a region of interest on a back side portion of a compaction roller.

Now referring to FIG. 10A, FIG. 10A is an illustration representing an infrared (IR) image 62, in the form of a missing tow infrared (IR) image 62e, of the region of interest 240 on the back side portion 16a of the back side 16 of the compaction roller 14 of the system 10 (see FIG. 1A). FIG. 10A shows the full width 242 of the compaction roller 14 and shows the width 244 of the region of interest 240. As shown in FIG. 10A, the IR image 62, in the form of the missing tow IR image 62e, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 10A, the first imprint 166a, the second imprint 166b, the third imprint 166c, the fourth imprint 166d, the fifth imprint 166e, the seventh imprint 166g, and the eighth imprint 166h are imprints 166 of tows 32 that are representative of tows 32 that are good or acceptable. As further shown in FIG. 10A, the sixth imprint 166f is an imprint 166 of a tow 32 that is representative of a missing tow 88c that did not feed out or drop from the composite laying head 36 and that did not get laid down on the substrate 42.

Figure 10B:
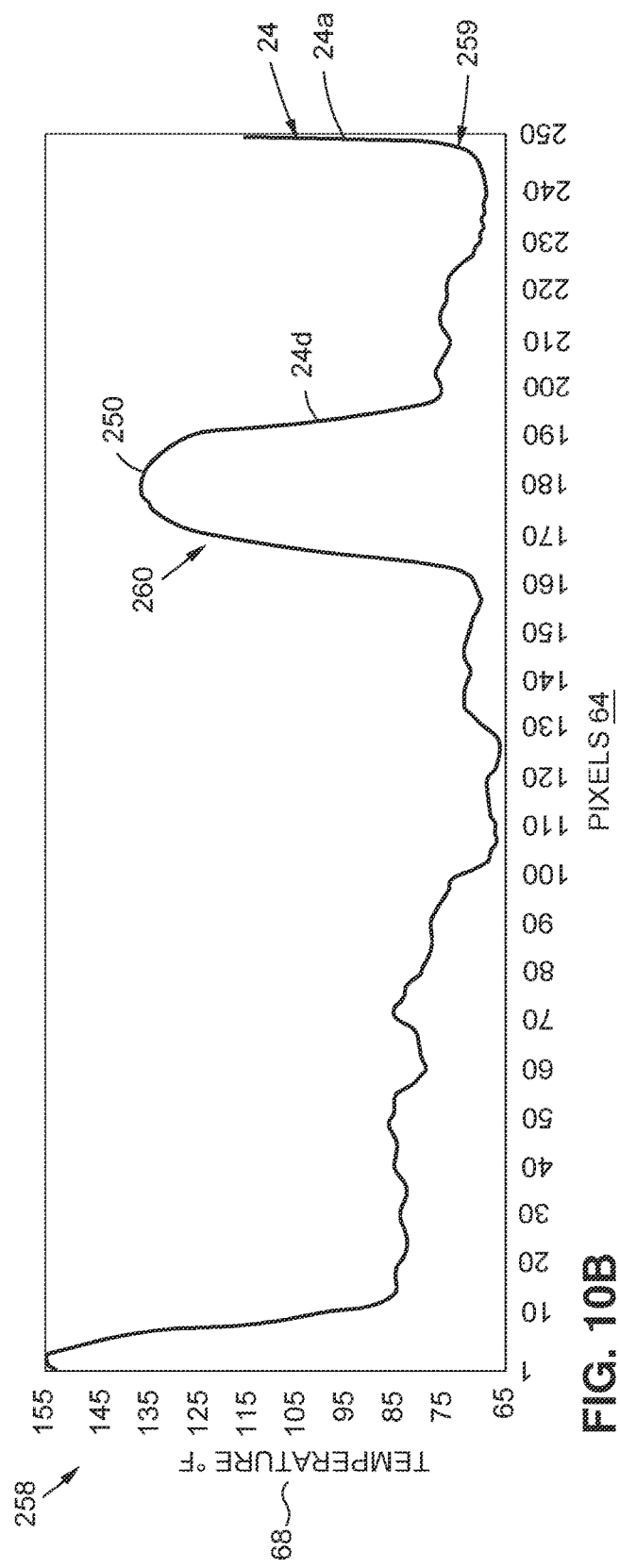
FIG. 10B is an illustration of a graph showing a missing tow temperature profile of the region of interest of FIG. 10A.

Now referring to FIG. 10B, FIG. 10B is an illustration of a graph 258 with a plot 259 of a temperature profile 24, such as an identified temperature profile 24a, in the form of a missing tow temperature profile 24d, of the region of interest 240, of FIG. 10A. The graph 258 shows pixels 64 along the x-axis, and shows temperature 68 of the tows 32, such as composite tows 32a, in degrees Fahrenheit (° F.), along the y-axis. As shown in FIG. 10B, the temperature profile 24, in the form of the missing tow temperature profile 24d, shows a portion 260 with a peak 250 at a high temperature (140° F.) to indicate the seventh imprint 166g with the missing tow 88c, in FIG. 10A. The tows 32, such as the composite tows 32a, are dispensed from the composite laying head 36 at a temperature 68 that is cooler than ambient temperature, and the compaction roller 14 is shielded from the heated substrate 42 heated by the heater 38, by the colder tow 32. If the tow 32 does not drop or feed out of the composite laying head 36, and there is a missing tow 88c, the compaction roller 14 has an imprint 166 with a higher or hotter temperature at the location of the missing tow 88c on the composite layup 30. The missing tow temperature profile 24d shown in graph 258 may be used to indicate that there is a layup condition 74, for example, a layup defect 88, and viewing the missing tow IR image 62e indicates and verifies that the missing tow 88c has occurred at that location of the composite layup 30.

Figure 11A:
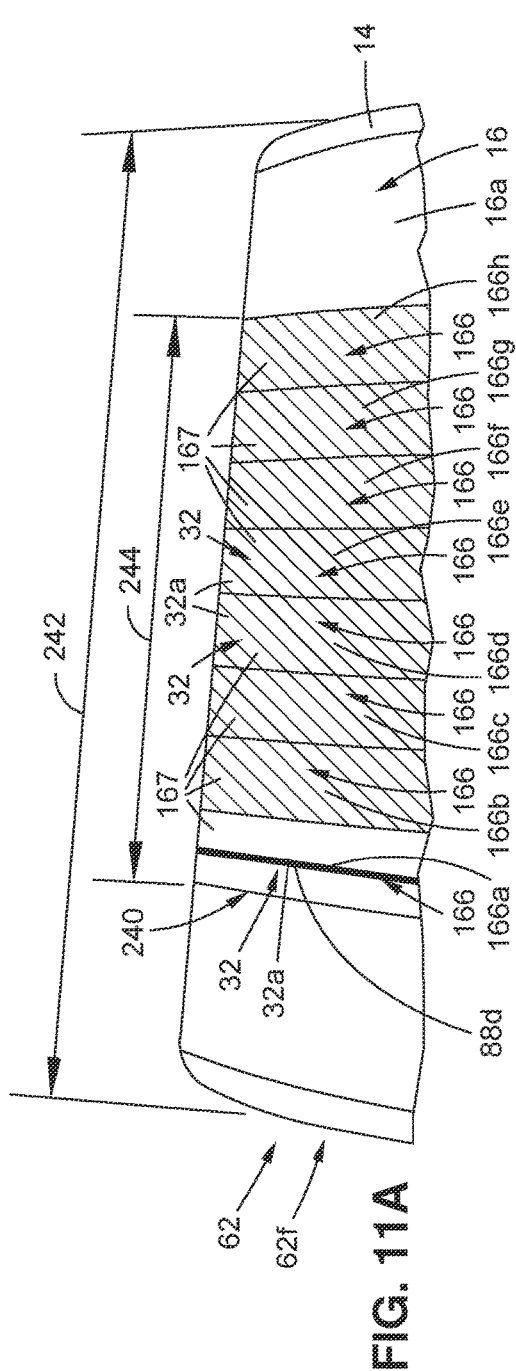
FIG. 11A is an illustration representing a tow fold infrared (IR) image of a region of interest on a back side portion of a compaction roller.

Now referring to FIG. 11A, FIG. 11A is an illustration representing an infrared (IR) image 62, in the form of a tow fold infrared (IR) image 62f, of the region of interest 240 on the back side portion 16a of the back side 16 of the compaction roller 14 of the system 10 (see FIG. 1A). FIG. 11A shows the full width 242 of the compaction roller 14 and shows the width 244 of the region of interest 240. As shown in FIG. 11A, the IR image 62, in the form of the tow fold IR image 62f, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 11A, the first imprint 166a is an imprint 166 of a tow 32 that is representative of a tow fold 88d, which is a tow 32 or an edge of a tow 32 that folds over on itself as it is laid down onto the substrate 42. As further shown in FIG. 11A, the second imprint 166b, the third imprint 166c, the fourth imprint 166d, the fifth imprint 166e, the sixth imprint 166f, the seventh imprint 166g, and the eighth imprint 166h are imprints 166 of tows 32 that are representative of tows 32 that are good or acceptable.

Figure 11B:
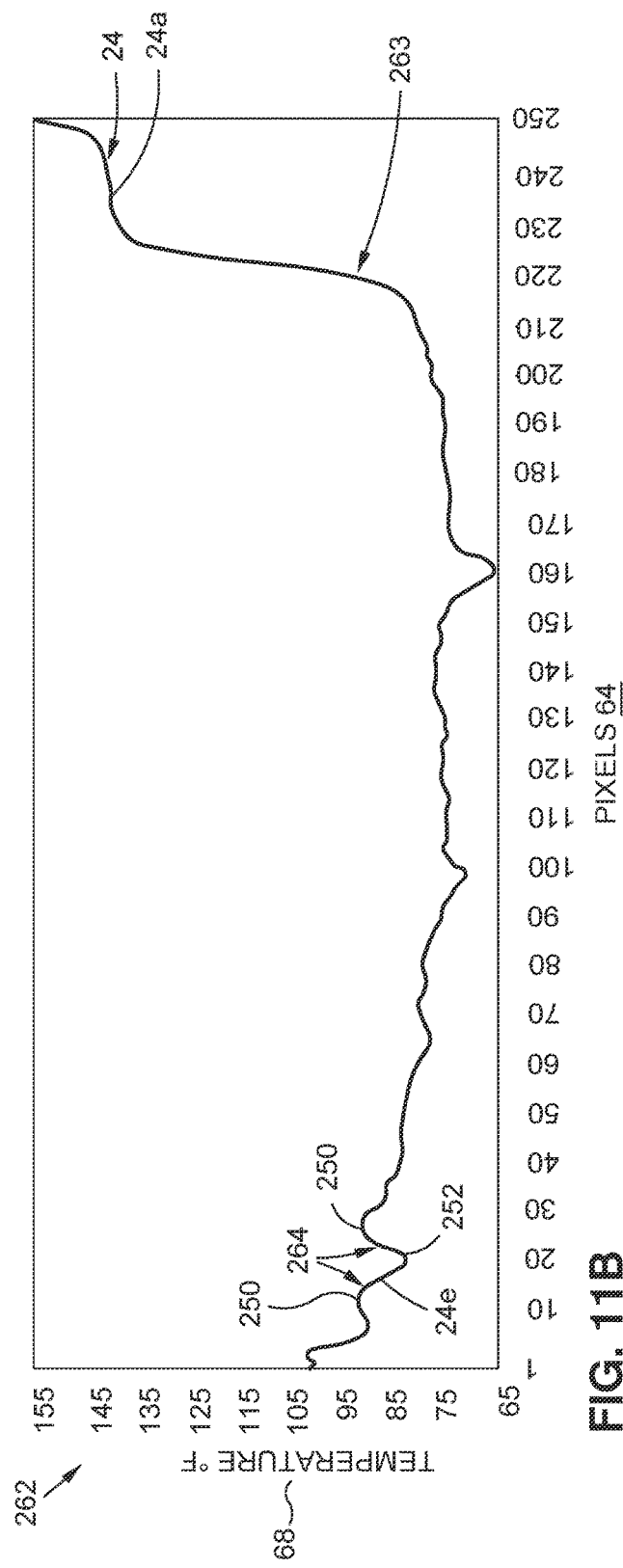
FIG. 11B is an illustration of a graph showing a tow fold temperature profile of the region of interest of FIG. 11A.

Now referring to FIG. 11B, FIG. 11B is an illustration of a graph 262 with a plot 263 of a temperature profile 24, such as an identified temperature profile 24a, in the form of a tow fold temperature profile 24e, of the region of interest 240, of FIG. 11A. The graph 262 shows pixels 64 along the x-axis, and shows temperature 68 of the tows 32, such as the composite tows 32a, in degrees Fahrenheit (° F.), along the y-axis. As shown in FIG. 11B, the temperature profile 24, in the form of the tow fold temperature profile 24e, shows a portion 264 with peaks 250 at a higher temperature (90° F.) and a valley 252 at a lower temperature (80° F.) between the peaks 250, to indicate the first imprint 166a with the tow fold 88d, in FIG. 11A. The tow fold temperature profile 24e shown in graph 262 may be used to indicate that there is a layup condition 74, for example, a layup defect 88, and viewing the tow fold IR image 62f indicates and verifies that the tow fold 88d has occurred at that location of the composite layup 30.

Figure 12A:
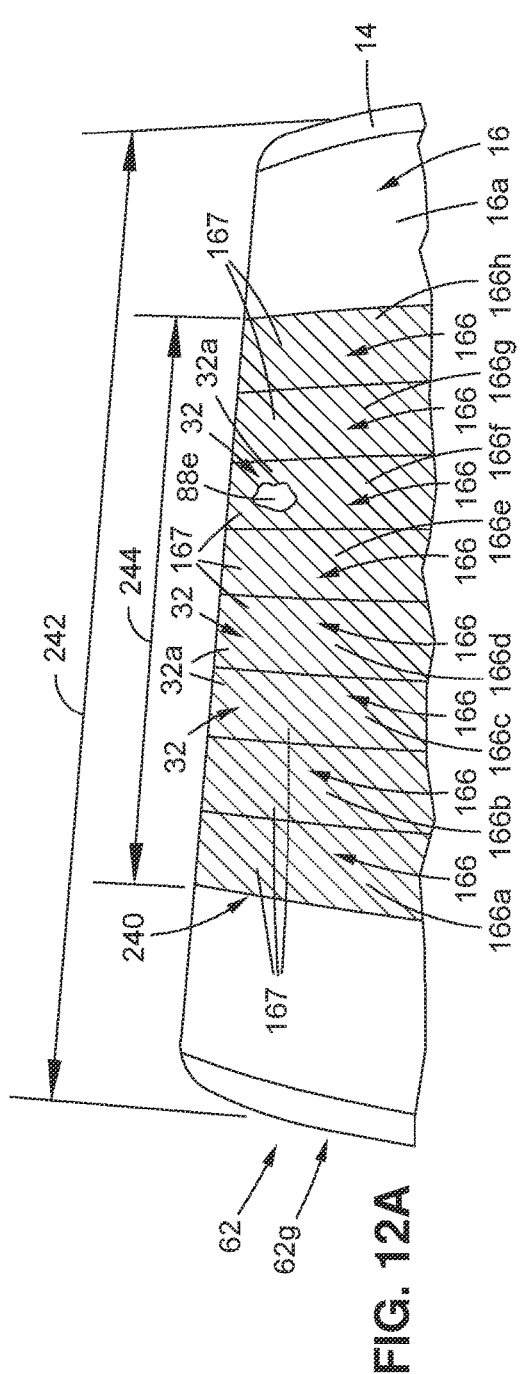
FIG. 12A is an illustration representing a fuzzball infrared (IR) image of a region of interest on a back side portion of a compaction roller.

Now referring to FIG. 12A, FIG. 12A is an illustration representing an infrared (IR) image 62, in the form of a fuzzball infrared (IR) image 62g, of the region of interest 240 on the back side portion 16a of the back side 16 of the compaction roller 14 of the system 10 (see FIG. 1A). FIG. 12A shows the full width 242 of the compaction roller 14 and shows the width 244 of the region of interest 240. As shown in FIG. 12A, the IR image 62, in the form of the fuzzball IR image 62g, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 12A, the first imprint 166a, the second imprint 166b, the third imprint 166c, the fourth imprint 166d, the fifth imprint 166e, the seventh imprint 166g, and the eighth imprint 166h are imprints 166 of tows 32 that are representative of tows 32 that are good or acceptable. As further shown in FIG. 12A, the sixth imprint 166f is an imprint 166 of a tow 32 that is representative of a tow 32 with a fuzzball 88e, where the compaction roller 14 has rolled over the fuzzball 88e that has fallen on the tow 32, as it is laid down onto the substrate 42.

Figure 12B:
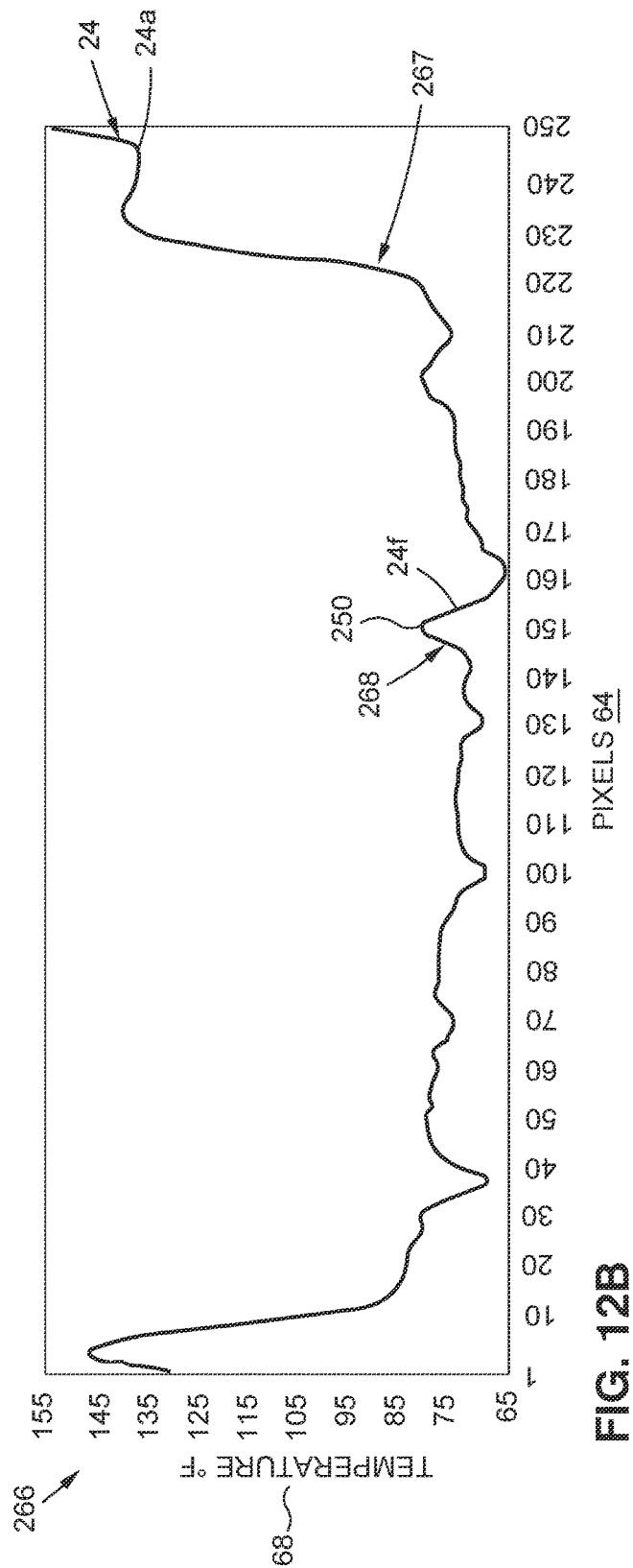
FIG. 12B is an illustration of a graph showing a fuzzball temperature profile of the region of interest of FIG. 12A.

Now referring to FIG. 12B, FIG. 12B is an illustration of a graph 266 with a plot 267 of a temperature profile 24, such as an identified temperature profile 24a, in the form of a fuzzball temperature profile 24f of the region of interest 240, of FIG. 12A. The graph 266 shows pixels 64 along the x-axis, and shows temperature 68 of the tows 32, such as the composite tows 32a, in degrees Fahrenheit (° F.), along the y-axis. As shown in FIG. 12B, the temperature profile 24, in the form of the fuzzball temperature profile 24f, shows a portion 268 with a peak 250 at a lower temperature (85° F.) to indicate the sixth imprint 166f with the tow 32 with the fuzzball 88e, in FIG. 12A. The fuzzball temperature profile 24f shown in graph 266 may be used to indicate that there is a layup condition 74, for example, a layup defect 88, and viewing the fuzzball IR image 62g indicates and verifies that the fuzzball 88e has occurred at that location of the composite layup 30.

Figure 13A:
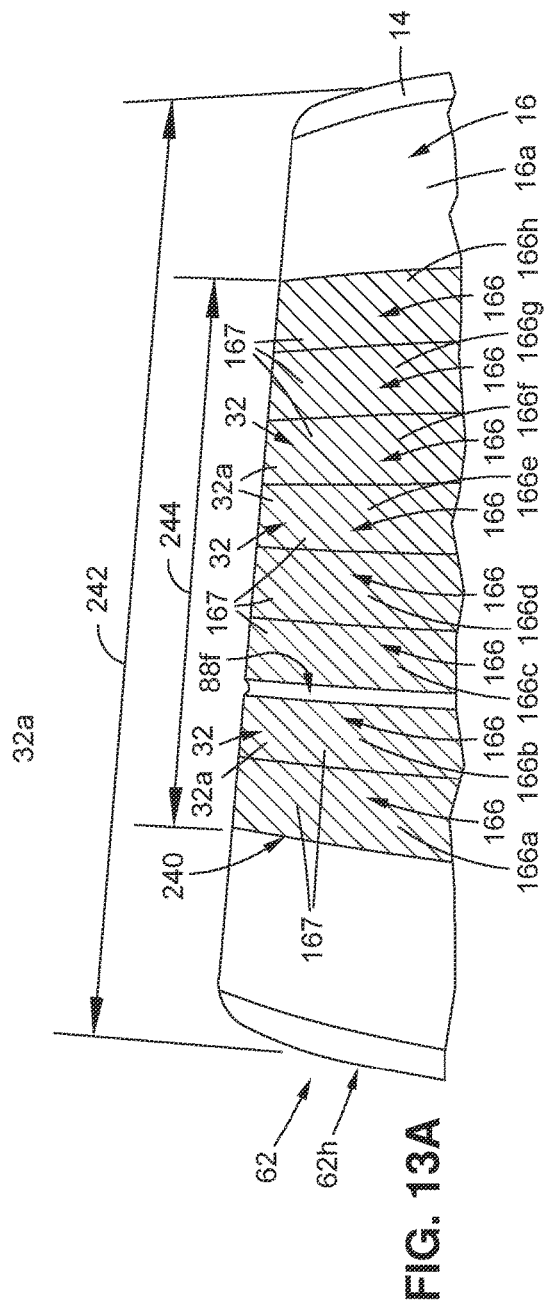
FIG. 13A is an illustration representing a gap infrared (IR) image of a region of interest on a back side portion of a compaction roller.

FIG. 13A is an illustration representing an infrared (IR) image 62, in the form of a gap infrared (IR) image 62h, of the region of interest 240 on the back side portion 16a of the back side 16 of the compaction roller 14 of the system 10 (see FIG. 1A). FIG. 13A shows the full width 242 of the compaction roller 14 and shows the width 244 of the region of interest 240. As shown in FIG. 13A, the IR image 62, in the form of the gap IR image 62h, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 13A, the first imprint 166a, the third imprint 166c, the fourth imprint 166d, the fifth imprint 166e, the sixth imprint 166f, the seventh imprint 166g, and the eighth imprint 166h are imprints 166 of tows 32 that are representative of tows 32 that are good or acceptable. As further shown in FIG. 13A, the second imprint 166b is an imprint 166 of a tow 32 that is representative of a tow 32 with a gap 88f between the second imprint 166b and the adjacent third imprint 166c, where the tow 32 did not get laid down properly on the substrate 42, and the gap 88f is formed between two tows 32.

Figure 13B:
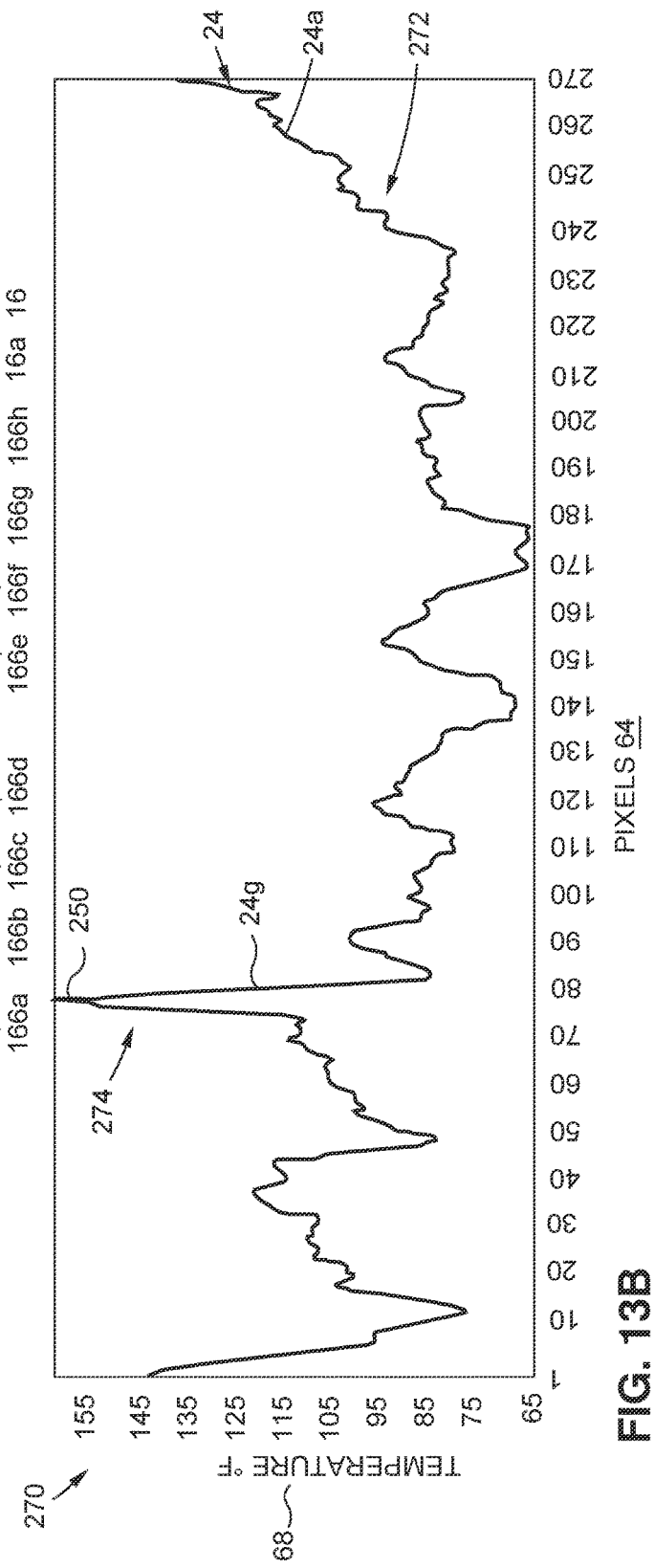
FIG. 13B is an illustration of a graph showing a gap temperature profile of the region of interest of FIG. 13A.

Now referring to FIG. 13B, FIG. 13B is an illustration of a graph 270 with a plot 272 of a temperature profile 24, such as an identified temperature profile 24a, in the form of a gap temperature profile 24g of the region of interest 240, of FIG. 13A. The graph 270 shows pixels 64 along the x-axis, and shows temperature 68 of the tows 32, such as the composite tows 32a, in degrees Fahrenheit (° F.), along the y-axis. As shown in FIG. 13B, the temperature profile 24, in the form of the gap temperature profile 24g, shows a portion 274 with a peak 250 at a high temperature (155° F.) to indicate the second imprint 166b with the tow 32 with the gap 88f, in FIG. 13A. The gap temperature profile 24g shown in graph 270 may be used to indicate that there is a layup condition 74, for example, a layup defect 88, and viewing the gap IR image 62h indicates and verifies that the gap 88f has occurred at that location of the composite layup 30.

Figure 14:
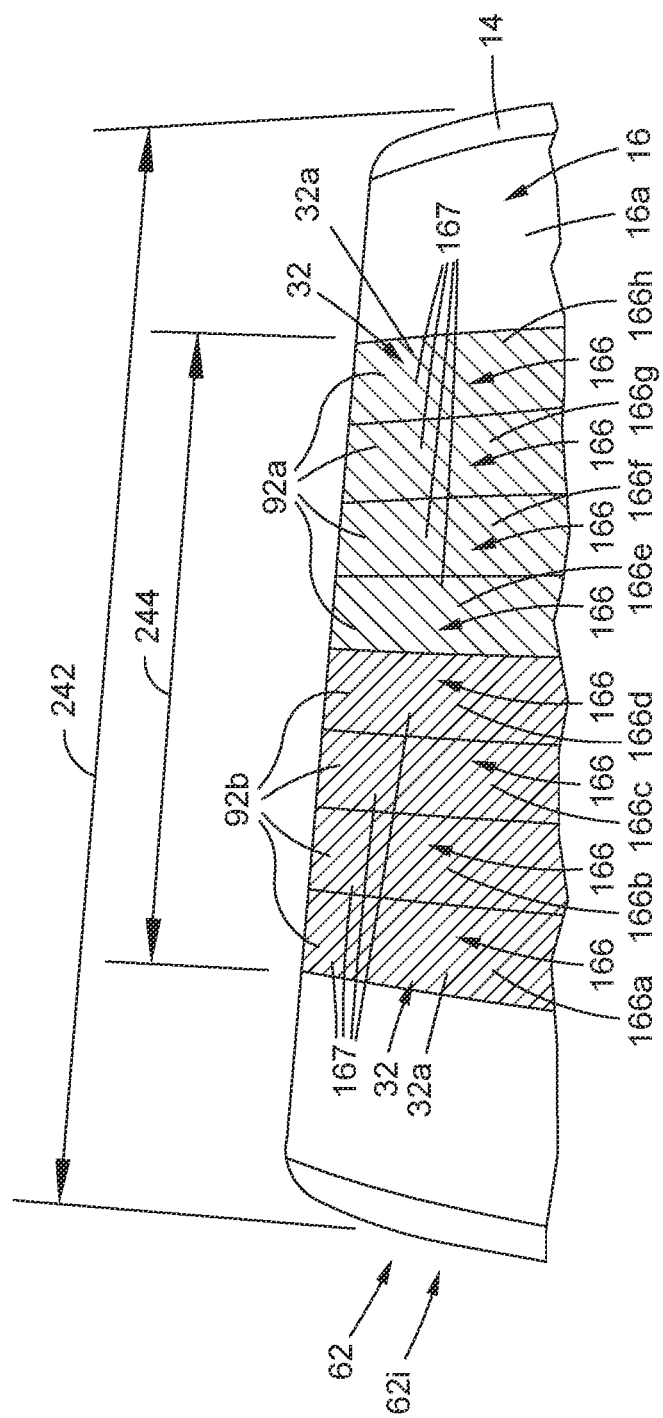
FIG. 14 is an illustration representing a good tack quality/poor tack quality infrared (IR) image of a region of interest on a back side portion of a compaction roller.

Now referring to FIG. 14, FIG. 14 is an illustration representing an infrared (IR) image 62, in the form of a good tack quality/poor tack quality infrared (IR) image 62i of the region of interest 240 on the back side portion 16a of the back side 16 of the compaction roller 14 of the system 10 (see FIG. 1A). FIG. 14 shows the full width 242 of the compaction roller 14 and shows the width 244 of the region of interest 240. As shown in FIG. 14, the IR image 62, in the form of the good tack quality/poor tack quality IR image 62i, shows eight (8) imprints 166, or thermal imprints 167, of tows 32, such as composite tows 32a, including first imprint 166a, second imprint 166b, third imprint 166c, fourth imprint 166d, fifth imprint 166e, sixth imprint 166f, seventh imprint 166g, and eighth imprint 166h. As shown in FIG. 14, the first imprint 166a, the second imprint 166b, the third imprint 166c, and the fourth imprint 166d are imprints 166 of tows 32 that representative of tows with a poor tack quality 92b (see also FIG. 1B). As further shown in FIG. 14, the fifth imprint 166e, the sixth imprint 166f, the seventh imprint 166g, and the eighth imprint 166h are imprints 166 of tows 32 that are representative of tows 32 having a good tack quality 92a (see also FIG. 1B) and are tows 32 that are good or acceptable. Although no graph showing a temperature profile 24, such as an identified temperature profile 24a, of the region of interest 240 of FIG. 14 is shown, a sign of good tack quality 92a is that the imprints 166 of the tows 32 on the compaction roller 14 show a uniformly warm temperature portion for a temperature profile 24, and a sign of poor tack quality 92b is that the imprints 166 of the tows 32 on the compaction roller 14 show a cooler temperature portion that is less uniform for a temperature profile 24.

Now referring to FIG. 15, FIG. 15 is an illustration of a perspective view of a vehicle 50, such as an aircraft 50a, incorporating a part 48, such as a composite part 48a, formed from a composite layup 30 (see FIG. 1A) of tows 32 (see FIG. 1A), such as composite tows 32a (see FIG. 1A), that may be monitored using an exemplary version of a system 10 (see FIG. 1A) and a method 200 (see FIG. 6) or a method 220 (see FIG. 7) of the disclosure. As shown in FIG. 15, the vehicle 50, such as the aircraft 50a, includes a fuselage 280, a nose 282, wings 284, engines 286, and an empennage 288. As shown in FIG. 15, the empennage 288 comprises horizontal stabilizers 290 and a vertical stabilizer 292. In one illustrative version, as shown in FIG. 15, the part 48, such as the composite part 48a, is used in the manufacture of the vehicle 50, such as aircraft 50a. The part 48, such as the composite part 48a, may also be made in the manufacture of vehicles 50, including rotorcraft, spacecraft, watercraft, and other suitable vehicles, or in the manufacture of other suitable structures.

Figure 16:
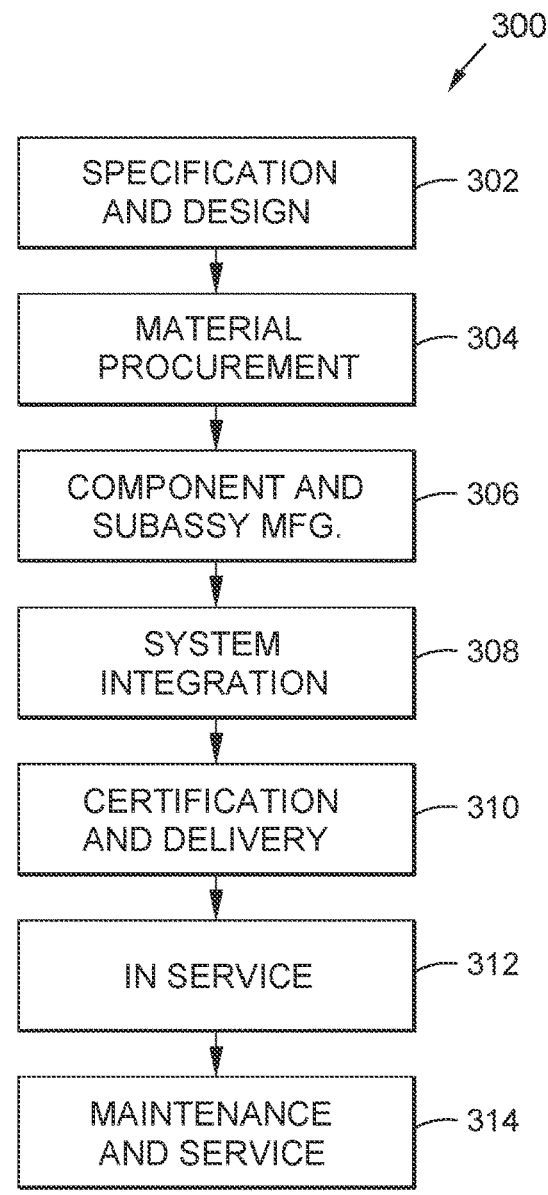
FIG. 16 is an illustration of a flow diagram of an exemplary aircraft manufacturing and service method.
Figure 17:
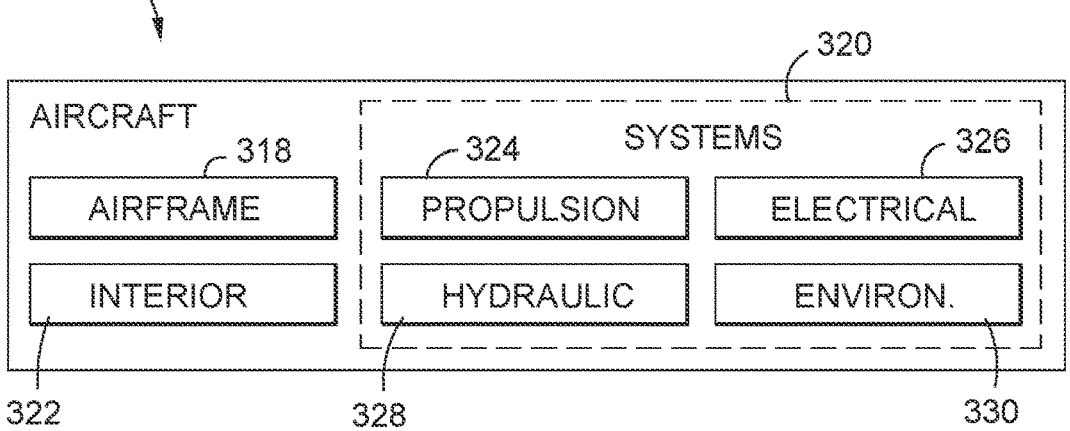
FIG. 17 is an illustration of an exemplary block diagram of an aircraft.

Now referring to FIGS. 16 and 17, FIG. 16 is an illustration of a flow diagram of an exemplary aircraft manufacturing and service method 300, and FIG. 17 is an illustration of an exemplary block diagram of an aircraft 316. Referring to FIGS. 16 and 17, versions of the disclosure may be described in the context of the aircraft manufacturing and service method 300 as shown in FIG. 16, and the aircraft 316 as shown in FIG. 17.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 17, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the system 10 (see FIGS. 1A-1B, 1B, 3-5), the method 200 (see FIG. 6), and the method 220 (see FIG. 7), provide for in-process monitoring 12 (see FIG. 1B) of the layup quality 26 (see FIG. 1B), an overall layup condition including layup defects 88 (see FIG. 1B), foreign object debris (FOD) 90 (see FIG. 1B), and tape tack quality 92 (see FIG. 1B), and the heat history 28 (see FIG. 1B) of the composite layup 30 (see FIG. 1A), by monitoring with one or more infrared (IR) cameras a field of view 162 (see FIG. 3) focused on the back side portion 16a (see FIG. 3) of the back side 16 (see FIG. 3) of the compaction roller 14 (see FIG. 3) of the composite laying head 36 or tape layup head. The illustrative versions recognize and take into account that the in-process monitoring 12 of the back side portion 16a of the back side 16 of the compaction roller 14 identifies one or more temperature profiles 24 (see FIG. 1B) of the compaction roller 14, to obtain one or more identified temperature profiles 24a (see FIG. 1B), to determine the layup quality 26 and the heat history 28 of the composite layup 30 (see FIG. 1A), during the automated composite layup using the composite layup machine 18.

Focusing the one or more IR cameras 60 on the back side portion 16a of the back side 16 of the compaction roller 14 enables monitoring of the compaction roller 14, and because there are no, or minimal, odd or unusual shifts in the field of view 162 of the IR camera 60, for example, the IR camera 60 undesirably viewing materials it is not set to see, like a tool during movement, the monitoring has an improved and greater consistency than monitoring the front side 17 of the compaction roller 14, or monitoring other areas of the manufacturing environment 20 (see FIG. 1A) or composite layup machine 18 (see FIG. 1A). The compaction roller's 14 intimate contact with the tows 32, such as the composite tows 32a, of the composite layup 30, at the point of compaction 164 (see FIG. 3) allows for any change in temperature 68 (see FIG. 1B) or thermal change in the tows 32, such as the composite tows 32a, to be imprinted, in the form of one or more imprints 166 (see FIG. 8A), on the back side portion 16a of the back side 16 of the compaction roller 14 for the IR camera 60 to view. Using one or more IR cameras 60 to view the back side 16 of the compaction roller 14 also avoids any issues of reflected energy from the heater 38. The one or more IR cameras 60, or thermal cameras, are focused on the back side portion 16a of the back side 16 of the compaction roller 14 on the composite layup machine 18 and are used to monitor the thermal artifacts or temperature profiles 24 of the compaction roller 14, to determine the layup quality 26 and the heat history 28.

In addition, disclosed versions of the system 10 (see FIGS. 1A-1B, 3-5), the method 200 (see FIG. 6), and the method 220 (see FIG. 7), avoid having to monitor the part surface, which avoids any confusion due to the presence of surface contour changes and various reflections and shifts in the field of view of the IR camera. Rather, the compaction roller 14 has a more uniform material profile, as compared to surface contour changes of the substrate 42. The compaction roller 14 provides an average of the temperature 68 of the tows 32, via conduction of heat 40 from the substrate 42.

Moreover, disclosed versions of the system 10 (see FIGS. 1A-1B, 3-5), the method 200 (see FIG. 6), and the method 220 (see FIG. 7), avoid having to measure the actual layup, which may be subject to a large amount of noise and processing. Further, disclosed versions of the system 10 (see FIGS. 1A-1B, 3-5), the method 200 (see FIG. 6), and the method 220 (see FIG. 7), allow for immediate adjustment or modification, in real-time, of settings, controls, and parameters 52 (see FIG. 1A), i.e., compaction speed 54 (see FIG. 1A), compaction pressure 56 (see FIG. 1A), and temperature output 58 (see FIG. 1A), of the composite laying head 36 and the compaction roller 14 of the composite layup machine 18, if indications 104 of layup defects 88, foreign object debris (FOD) 90, and/or tape tack quality 92 are seen during monitoring of the compaction roller 14. Such adjustments or modifications may be made before a next or subsequent round of tows 32, such as composite tows 32a, are laid down on the substrate 42. Further, disclosed versions of the system 10 (see FIGS. 1A-1B, 3-5), the method 200 (see FIG. 6), and the method 220 (see FIG. 7), provide a way to verify that there are no layup defects 88, no foreign object debris (FOD) 90, and/or no tape tack quality 92 issues that would require that the composite layup machine 18 be stopped. Thus, the composite layup machine 18 may be run at an optimal efficiency, and delays due to stopping operation of the composite layup machine 18 to inspect or monitor such issues may be eliminated or minimized.

In addition, disclosed versions of the system 10 (see FIGS. 1A-1B, 3-5), the method 200 (see FIG. 6), and the method 220 (see FIG. 7), quantitatively evaluate the layup quality 26 and layup conditions 74 of the composite layup 30 during the layup process, and automate the verification of the layup quality 26. Further, disclosed versions of the system 10 (see FIGS. 1A-1B, 3-5), the method 200 (see FIG. 6), and the method 220 (see FIG. 7), use one or more IR cameras 60 positioned to view an optimal location on the back side 16 of the compaction roller 14, in an unobstructed and easily visible manner, to determine the layup quality 26 and/or the heat history 28 of the composite layup 30.

Further, the disclosure comprises embodiments according to the following clauses:

Clause 1. A method comprising the steps of:
directing one or more infrared cameras at a compaction roller of a composite laying head of a composite layup machine, wherein the one or more infrared cameras are mounted aft of the compaction roller;
applying heat to a substrate by a heater, wherein the heater is mounted forward of the compaction roller;
using the one or more infrared cameras, to obtain one or more infrared images of the compaction roller, during laying down of one or more composite tows of a composite layup onto the substrate by the compaction roller;
identifying, based on the one or more infrared images, one or more temperature profiles of the compaction roller, to obtain one or more identified temperature profiles; and analyzing the one or more identified temperature profiles, to determine one or more of, a layup quality of the composite layup, and a heat history of the composite layup.

Clause 2. The method of Clause 1, further comprising, after analyzing the one or more identified temperature profiles, the step of:
determining, based on the one or more identified temperature profiles, at least one layup condition of the composite layup.

Clause 3. The method of Clause 2, wherein determining, based on the one or more identified temperature profiles, the at least one layup condition of the composite layup, further comprises:
determining, based on the one or more identified temperature profiles, the at least one layup condition comprising one or more of, a layup defect, foreign object debris, and a tape tack quality.

Clause 4. The method of Clause 3, wherein determining, based on the one or more identified temperature profiles, the at least one layup condition of the composite layup, further comprises:
determining, based on the one or more identified temperature profiles, the at least one layup condition, wherein the layup defect comprises a tow twist, a misaligned tow end, a missing tow, a tow fold, a fuzzball, a gap, or an overlap.

Clause 5. The method of any of Clauses 2 to 4, further comprising, after determining, based on the one or more identified temperature profiles, the at least one layup condition of the composite layup, the step of:
adjusting, based on one or more of, the one or more identified temperature profiles, and the at least one layup condition, one or more of, a compaction speed of the compaction roller, a compaction pressure applied by the compaction roller, and a temperature output of the heater, to limit a material of the one or more composite tows adhering to a surface of the compaction roller, and to avoid the material wrapping around the compaction roller.

Clause 6. The method of any of Clauses 2 to 5, wherein determining, based on the one or more identified temperature profiles, the at least one layup condition of the composite layup, further comprises:
using a machine vision, to identify the at least one layup condition, and to automatically alert a user interface of the at least one layup condition.

Clause 7. The method of any of Clauses 2 to 6, wherein determining, based on the one or more identified temperature profiles, the at least one layup condition of the composite layup, further comprises:
identifying a size of the at least one layup condition, based on the one or more infrared images;
determining if the size of the at least one layup condition is greater than a threshold size, wherein the threshold size is based on a known reference standard size; and
receiving an indication to a user interface, when the size of the at least one layup condition is greater than the threshold size.

Clause 8. The method of any of Clauses 1 to 7, further comprising, after identifying, based on the one or more infrared images, the one or more temperature profiles of the compaction roller, the step of:
using a computer and a computer program product to generate an aggregate depiction of two or more identified temperature profiles of the compaction roller, to enable a comparison of the two or more identified temperature profiles to each other.

Clause 9. The method of any of Clauses 1 to 8, wherein using the one or more infrared cameras, to obtain the one or more infrared images of the compaction roller, further comprises:
using the one or more infrared cameras to obtain the one or more infrared images comprising one of, one or more infrared photographic images, and one or more infrared video images.

Clause 10. The method of any of Clauses 1 to 9, wherein using the one or more infrared cameras, to obtain the one or more infrared images of the compaction roller, further comprises:
using two or more infrared cameras that are synchronized, to obtain two or more infrared images that are configured to be merged together in a computer software of a computer system.

Clause 11. The method of any of Clauses 1 to 10, wherein identifying, based on the one or more infrared images, the one or more temperature profiles of the compaction roller, further comprises:
identifying, based on the one or more infrared images, the one or more temperature profiles of a back side portion of the compaction roller, where the one or more composite tows are in contact with compaction roller.

Clause 12. A method for in-process monitoring of a compaction roller of a composite layup machine, the method comprising the steps of:
directing one or more infrared cameras at a back side of the compaction roller of a composite laying head of the composite layup machine, wherein the one or more infrared cameras are mounted aft of the compaction roller;
applying heat to a substrate by a heater, wherein the heater is mounted forward of the compaction roller;
monitoring the back side of the compaction roller, by using the one or more infrared cameras, to obtain one or more infrared images of the back side of the compaction roller, during laying down of one or more composite tows of a composite layup onto the substrate by the compaction roller;

identifying, based on the one or more infrared images, one or more temperature profiles of a back side portion of the compaction roller, to obtain one or more identified temperature profiles, wherein the one or more composite tows are in contact with the compaction roller; and analyzing the one or more identified temperature profiles, to determine one or more of, a layup quality of the composite layup, and a heat history of the composite layup.

Clause 13. The method of Clause 12, further comprising, after analyzing the one or more identified temperature profiles, the step of:

determining, based on the one or more identified temperature profiles, at least one layup condition of the composite layup.

Clause 14. The method of Clause 13, wherein determining, based on the one or more identified temperature profiles, the at least one layup condition of the composite layup, further comprises:

determining, based on the one or more identified temperature profiles, the at least one layup condition comprising one or more of, a layup defect, foreign object debris, and a tape tack quality.

Clause 15. The method of Clause 14, wherein determining, based on the one or more identified temperature profiles, the at least one layup condition of the composite layup, further comprises:

determining, based on the one or more identified temperature profiles, the at least one layup condition, wherein the layup defect comprises a tow twist, a misaligned tow end, a missing tow, a tow fold, a fuzzball, a gap, or an overlap.

Clause 16. The method of any of Clauses 13 to 15, further comprising, after determining, based on the one or more identified temperature profiles, the at least one layup condition of the composite layup, the step of:

adjusting, based on one or more of, the one or more identified temperature profiles, and the at least one layup condition, one or more of, a compaction speed of the compaction roller, a compaction pressure applied by the compaction roller, and a temperature output of the heater, to limit a material of the one or more composite tows adhering to a surface of the compaction roller, and to avoid the material wrapping around the compaction roller.

Clause 17. The method of Clause 16, further comprising, after adjusting, based on the one or more of, the one or more identified temperature profiles, and the at least one layup condition, the step of:

using the composite layup to form a composite part for an aircraft.

Clause 18. The method of any of Clauses 12 to 17, wherein monitoring the back side of the compaction roller, by using the one or more infrared cameras, further comprises:

monitoring the back side of the compaction roller, by using two or more infrared cameras that are synchronized, to obtain two or more infrared images that are configured to be merged together in a computer software of a computer system.

Clause 19. A system for in-process monitoring of a compaction roller of a composite layup machine, the system comprising:

the composite layup machine comprising:
(i) a composite laying head with the compaction roller coupled to the composite laying head;
(ii) a heater mounted forward of the compaction roller, the heater configured to apply heat to a substrate; and
(iii) one or more infrared cameras, mounted aft of the compaction roller, to monitor the compaction roller, wherein the one or more infrared cameras are configured to each capture one or more infrared images of the compaction roller, during laying down of one or more composite tows of a composite layup onto the substrate by the compaction roller;

a control system configured to control the composite layup machine; and a computer system having a composite analyzer, the composite analyzer configured to identify, based on the one or more infrared images, one or more temperature profiles of the compaction roller, to obtain one or more identified temperature profiles, and to enable analyzing the one or more identified temperature profiles, to determine one or more of, a layup quality of the composite layup, and a heat history of the composite layup.

Clause 20. The system of Clause 19, wherein the one or more identified temperature profiles are used to determine at least one layup condition of the composite layup.

Clause 21. The system of Clause 20, wherein the at least one layup condition comprises one or more of, a layup defect, foreign object debris, and a tape tack quality.

Clause 22. The system of Clause 21, wherein the layup defect comprises a tow twist, a misaligned tow end, a missing tow, a tow fold, a fuzzball, a gap, or an overlap.

Clause 23. The system of any of Clauses 20 to 22, wherein the control system comprises one or more controllers configured to adjust, based on one or more of, the one or more identified temperature profiles, and the at least one layup condition, one or more of, a compaction speed of the compaction roller, a compaction pressure applied by the compaction roller, and a temperature output of the heater, to limit a material of the one or more composite tows adhering to a surface of the compaction roller, and to avoid the material wrapping around the compaction roller.

Clause 24. The system of any of Clauses 19 to 23, wherein the computer system further comprises a computer and a computer program product, to generate an aggregate depiction of two or more identified temperature profiles of the compaction roller, to enable a comparison of the two or more identified temperature profiles to each other.

Clause 25. The system of any of Clauses 19 to 24, wherein the one or more infrared cameras comprise two or more infrared cameras that are synchronized, to obtain two or more infrared images that are configured to be merged together in a computer software of the computer system.

Clause 26. The system of any of Clauses 19 to 25, wherein the one or more infrared images comprise one of, one or more infrared photographic images, and one or more infrared video images.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method comprising the steps of:
directing one or more infrared cameras at a back side of a compaction roller of a composite laying head of a composite layup machine, wherein the one or more infrared cameras are mounted aft of the compaction roller, and the one or more infrared cameras have a field of view of a back side portion of the back side of the compaction roller;
applying heat to a substrate by a heater, wherein the heater is mounted forward of the compaction roller;
using the one or more infrared cameras, to obtain one or more infrared images of the compaction roller, during laying down of one or more composite tows of a composite layup onto the substrate by the compaction roller, the one or more infrared images comprising thermal imprints of the one or more composite tows that the compaction roller has made contact with at a point of compaction, to allow for a temperature change or a thermal change in the one or more composite tows to be imprinted on the back side portion of the back side of the compaction roller;
identifying, based on the one or more infrared images, one or more temperature profiles of the compaction roller, to obtain one or more identified temperature profiles; and
analyzing the one or more identified temperature profiles, to determine a layup quality of the composite layup.

2. The method of claim 1, further comprising, after analyzing the one or more identified temperature profiles, the step of:
determining, based on the one or more identified temperature profiles, at least one layup condition of the composite layup.

3. The method of claim 2, wherein determining, based on the one or more identified temperature profiles, the at least one layup condition of the composite layup, further comprises:
determining, based on the one or more identified temperature profiles, the at least one layup condition comprising one or more of, a layup defect, foreign object debris, and a tape tack quality.

4. The method of claim 3, wherein determining, based on the one or more identified temperature profiles, the at least one layup condition of the composite layup, further comprises:
determining, based on the one or more identified temperature profiles, the at least one layup condition, wherein the layup defect comprises a tow twist, a misaligned tow end, a missing tow, a tow fold, a fuzzball, a gap, or an overlap.

5. The method of claim 2, further comprising, after determining, based on the one or more identified temperature profiles, the at least one layup condition of the composite layup, the step of:
adjusting, based on one or more of, the one or more identified temperature profiles, and the at least one layup condition, one or more of, a compaction speed of the compaction roller, a compaction pressure applied by the compaction roller, and a temperature output of the heater, to limit a material of the one or more composite tows adhering to a surface of the compaction roller, and to avoid the material wrapping around the compaction roller.

6. The method of claim 2, wherein determining, based on the one or more identified temperature profiles, the at least one layup condition of the composite layup, further comprises:
using a machine vision, to identify the at least one layup condition, and to automatically alert a user interface of the at least one layup condition.

7. The method of claim 2, wherein determining, based on the one or more identified temperature profiles, the at least one layup condition of the composite layup, further comprises:
identifying a size of the at least one layup condition, based on the one or more infrared images;
determining if the size of the at least one layup condition is greater than a threshold size, wherein the threshold size is based on a known reference standard size; and
receiving an indication to a user interface, when the size of the at least one layup condition is greater than the threshold size.

8. The method of claim 1, further comprising, after identifying, based on the one or more infrared images, the one or more temperature profiles of the compaction roller, the step of:
using a computer and a computer program product to generate an aggregate depiction of two or more identified temperature profiles of the compaction roller, to enable a comparison of the two or more identified temperature profiles to each other.

9. The method of claim 1, wherein using the one or more infrared cameras, to obtain the one or more infrared images of the compaction roller, further comprises:
using the one or more infrared cameras to obtain the one or more infrared images comprising one of, one or more infrared photographic images, and one or more infrared video images.

10. The method of claim 1, wherein using the one or more infrared cameras, to obtain the one or more infrared images of the compaction roller, further comprises:
using two or more infrared cameras that are synchronized, to obtain two or more infrared images that are configured to be merged together in a computer software of a computer system.

11. A method for in-process monitoring of a compaction roller of a composite layup machine, the method comprising the steps of:
directing one or more infrared cameras at a back side of the compaction roller of a composite laying head of the composite layup machine, wherein the one or more infrared cameras are mounted aft of the compaction roller, and the one or more infrared cameras have a field of view of a back side portion of the back side of the compaction roller;
applying heat to a substrate by a heater, wherein the heater is mounted forward of the compaction roller;
monitoring the back side of the compaction roller, by using the one or more infrared cameras, to obtain one or more infrared images of the back side of the compaction roller, during laying down of one or more composite tows of a composite layup onto the substrate by the compaction roller, the one or more infrared images comprising thermal imprints of the one or more composite tows that the compaction roller has made contact with at a point of compaction, to allow for a temperature change or a thermal change in the one or more composite tows to be imprinted on the back side portion of the back side of the compaction roller;

identifying, based on the one or more infrared images, one or more temperature profiles of the back side portion of the compaction roller, to obtain one or more identified temperature profiles, wherein the one or more composite tows are in contact with the compaction roller; and analyzing the one or more identified temperature profiles, to determine a layup quality of the composite layup.

12. The method of claim 11, further comprising, after analyzing the one or more identified temperature profiles, the step of:

determining, based on the one or more identified temperature profiles, at least one layup condition of the composite layup.

13. The method of claim 12, wherein determining, based on the one or more identified temperature profiles, the at least one layup condition of the composite layup, further comprises:

determining, based on the one or more identified temperature profiles, the at least one layup condition comprising one or more of, a layup defect, foreign object debris, and a tape tack quality.

14. The method of claim 12, further comprising, after determining, based on the one or more identified temperature profiles, the at least one layup condition of the composite layup, the step of:

adjusting, based on one or more of, the one or more identified temperature profiles, and the at least one layup condition, one or more of, a compaction speed of the compaction roller, a compaction pressure applied by the compaction roller, and a temperature output of the heater, to limit a material of the one or more composite tows adhering to a surface of the compaction roller, and to avoid the material wrapping around the compaction roller.

15. The method of claim 14, further comprising, after adjusting, based on the one or more of, the one or more identified temperature profiles, and the at least one layup condition, the step of:

using the composite layup to form a composite part for an aircraft.

16. A system for in-process monitoring of a compaction roller of a composite layup machine, the system comprising:

the composite layup machine comprising:

(i) a composite laying head with the compaction roller coupled to the composite laying head;

(ii) a heater mounted forward of the compaction roller, the heater configured to apply heat to a substrate; and (iii) one or more infrared cameras, mounted aft of the compaction roller, to monitor a back side of the compaction roller, wherein the one or more infrared cameras are configured to each capture one or more infrared images of the compaction roller, during laying down of one or more composite tows of a composite layup onto the substrate by the compaction roller, and the one or more infrared cameras having a field of view of a back side portion of the back side of the compaction roller, and the one or more infrared images comprising thermal imprints of the one or more composite tows that the compaction roller has made contact with at a point of compaction, to allow for a temperature change or a thermal change in the one or more composite tows to be imprinted on the back side portion of the back side of the compaction roller;

a control system configured to control the composite layup machine; and a computer system having a composite analyzer, the composite analyzer configured to identify, based on the one or more infrared images, one or more temperature profiles of the compaction roller, to obtain one or more identified temperature profiles, and to enable analyzing the one or more identified temperature profiles, to determine a layup quality of the composite layup, and to determine at least one layup condition of the composite layup, the layup condition comprising a layup defect comprising a tow twist, a misaligned tow end, a missing tow, a tow fold, a fuzzball, a gap, or an overlap.

17. The system of claim 16, wherein the layup condition further comprises a foreign object debris or a tape tack quality.

18. The system of claim 17, wherein the control system comprises one or more controllers configured to adjust, based on one or more of, the one or more identified temperature profiles, and the at least one layup condition, one or more of, a compaction speed of the compaction roller, a compaction pressure applied by the compaction roller, and a temperature output of the heater, to limit a material of the one or more composite tows adhering to a surface of the compaction roller, and to avoid the material wrapping around the compaction roller.

19. The system of claim 16, wherein the computer system further comprises a computer and a computer program product, to generate an aggregate depiction of two or more identified temperature profiles of the compaction roller, to enable a comparison of the two or more identified temperature profiles to each other.

20. The system of claim 16, wherein the one or more infrared cameras comprise two or more infrared cameras that are synchronized, to obtain two or more infrared images that are configured to be merged together in a computer software of the computer system.

* * * * *